US012435552B2

(12) United States Patent
Li et al.

(10) Patent No.: US 12,435,552 B2
(45) Date of Patent: Oct. 7, 2025

(54) DRIVING DEVICE

(71) Applicant: Shenzhen Hopo Window Control Technology Co., Ltd, Guangdong (CN)

(72) Inventors: Shupeng Li, Guangdong (CN); Xiyong Pan, Guangdong (CN); Shuangli Wang, Guangdong (CN)

(73) Assignee: Shenzhen Hopo Window Control Technology Co., Ltd, Guangdong (CN)

( * ) Notice: Subject to any disclaimer, the term of this patent is extended or adjusted under 35 U.S.C. 154(b) by 281 days.

(21) Appl. No.: 18/274,591

(22) PCT Filed: Jan. 28, 2021

(86) PCT No.: PCT/CN2021/074186

§ 371 (c)(1),
(2) Date: Jul. 27, 2023

(87) PCT Pub. No.: WO2022/062291

PCT Pub. Date: Mar. 31, 2022

(65) Prior Publication Data

US 2024/0093542 A1 Mar. 21, 2024

(30) Foreign Application Priority Data

Sep. 28, 2020 (CN) ......................... 202011045232.0

(51) Int. Cl.
*E05C 9/02* (2006.01)
*E05B 1/00* (2006.01)

(52) U.S. Cl.
CPC .............. *E05C 9/021* (2013.01); *E05B 1/003* (2013.01)

(58) Field of Classification Search
CPC . E05B 1/003; E05B 3/00; E05B 53/00; E05B 15/006; E05C 9/021; E05C 9/12;
(Continued)

(56) References Cited

U.S. PATENT DOCUMENTS 4,326,738 A * 4/1982 Loftus ........................ E05B 3/06 292/336.3
6,782,661 B2 * 8/2004 Manzella ................ E05F 11/16 49/192

(Continued)

FOREIGN PATENT DOCUMENTS

BE 1014943 A3 * 7/2004 ............. E05C 9/066
CN 2900701 Y 5/2007

(Continued)

OTHER PUBLICATIONS

EP0863282 Espacenet machine translation of description and claims (Year: 2025).*

(Continued)

*Primary Examiner* — Kristina R Fulton
*Assistant Examiner* — Steven A Tullia
(74) *Attorney, Agent, or Firm* — Taft Stettinius & Hollister LLP

(57) ABSTRACT

A driving device including a transmission mechanism, a lever handle, and a locking mechanism. The transmission mechanism includes a mounting housing and a movable member. The mounting housing is formed with a sliding groove, and the stopper edges are respectively disposed on the tops of two sidewalls of the sliding groove. The movable member is configured to pass through the sliding groove. The bottom wall of the movable member is provided with a transmission rack. The lever handle includes a handle, a mount, a connection shaft, and a second fastener. An end of the handle is formed with a second mounting groove that is provided with an internal tooth portion. The mount is disposed in the second mounting groove and can be connected to a section bar member. The connection shaft is rotatably disposed in the mount and includes a first external tooth portion and a second external tooth portion. The first external tooth portion meshes with the internal tooth portion,
(Continued)

and the second external tooth portion meshes with the transmission rack. An end of the second fastener is connected to the bottom wall of the second mounting groove. The locking mechanism is configured to pass through the mounting housing and a mounting wall and is connected to the mount.

16 Claims, 19 Drawing Sheets

(58) Field of Classification Search
CPC . E05C 9/20; E05C 9/004; E05C 9/028; Y10T 292/0836
See application file for complete search history.

(56) References Cited

U.S. PATENT DOCUMENTS

| | | | | |
|---|---|---|---|---|
| 7,913,456 | B2 * | 3/2011 | Balbo Di Vinadio | E05C 9/021 49/460 |
| 8,099,907 | B2 * | 1/2012 | Balbo Di Vinadio | E05D 15/5208 49/192 |

FOREIGN PATENT DOCUMENTS

| | | | | | |
|---|---|---|---|---|---|
| CN | 101652525 | A | * | 2/2010 | E05C 9/20 |
| CN | 202578201 | U | | 12/2012 | |
| CN | 204677065 | U | * | 9/2015 | E05C 19/00 |
| CN | 204876824 | U | | 12/2015 | |
| CN | 106661898 | A | | 5/2017 | |
| CN | 207228786 | U | | 4/2018 | |
| CN | 209556543 | U | | 10/2019 | |
| CN | 209620803 | U | * | 11/2019 | E05B 3/00 |
| CN | 210178110 | U | * | 3/2020 | E05B 3/00 |
| CN | 111395871 | A | | 7/2020 | |
| CN | 111472614 | A | | 7/2020 | |
| CN | 111485761 | A | | 8/2020 | |
| CN | 111663844 | A | | 9/2020 | |
| CN | 112065180 | A | | 12/2020 | |
| CN | 112096175 | A | | 12/2020 | |
| CN | 212317705 | U | | 1/2021 | |
| CN | 213393452 | U | | 6/2021 | |
| CN | 213627042 | U | | 7/2021 | |
| DE | 2164441 | A1 | * | 6/1973 | E05C 9/20 |
| DE | 2408311 | A1 | * | 8/1975 | E05C 9/20 |
| DE | 2515990 | A1 | * | 10/1976 | E05C 9/20 |
| DE | 20311990 | U1 | | 10/2003 | |
| DE | 10322778 | A1 | | 12/2004 | |
| DE | 202004003653 | U1 | * | 8/2005 | E05C 9/02 |
| DE | 202004004009 | U1 | * | 9/2005 | E05C 9/02 |
| DE | 102017215611 | A1 | * | 3/2019 | E05B 9/08 |
| EP | 0671530 | B1 | * | 9/1998 | E05C 9/004 |
| EP | 0863282 | A2 | * | 9/1998 | E05C 9/185 |
| EP | 1491706 | A1 | * | 12/2004 | E05C 9/006 |
| EP | 1580371 | A2 | * | 9/2005 | E05C 9/02 |
| EP | 1619326 | A1 | * | 1/2006 | E05B 63/185 |
| EP | 1978187 | A1 | * | 10/2008 | E05B 3/00 |
| EP | 1580370 | B1 | * | 12/2008 | E05C 9/02 |
| EP | 2770143 | A2 | * | 8/2014 | E05C 9/021 |
| EP | 3480394 | A1 | * | 5/2019 | E05B 3/08 |
| EP | 3161230 | B1 | * | 12/2019 | E05B 3/00 |
| ES | 1148208 | U | * | 12/2015 | E05B 3/04 |
| ES | 2780903 | T3 | * | 8/2020 | E05B 3/00 |
| FR | 2705991 | B1 | * | 8/1995 | E05C 9/20 |
| FR | 2786525 | B1 | * | 5/2001 | E05B 63/185 |
| FR | 3047265 | A1 | * | 8/2017 | E05B 3/00 |
| GB | 2384816 | A | * | 8/2003 | E05C 9/006 |
| WO | WO-2015198170 | A1 | * | 12/2015 | E05B 3/00 |
| WO | 2022062290 | A1 | | 3/2022 | |

OTHER PUBLICATIONS

First Chinese Office Action; The State Intellectual Property Office of People's Republic of China; Chinese Patent Application No. 202011045232.0; Jun. 20, 2024; 10 pages.
Second Chinese Office Action; The State Intellectual Property Office of People's Republic of China; Chinese Patent Application No. 202011045232.0; Aug. 21, 2024; 15 pages.
Extended European Search Report; European Patent Office; European Application No. 21870681.0; Oct. 28, 2024; 37 pages.
International Search Report; China National Intellectual Property Administration; International Application No. PCT/CN2021/074186; Jun. 25, 2021; 6 pages.

* cited by examiner

DRIVING DEVICE

CROSS REFERENCE TO RELATED APPLICATIONS

This application is a U.S. national stage filing of International Patent Application No. PCT/CN2021/074186 filed Jan. 28, 2021, which claims priority to Chinese Patent Application No. 202011045232.0 filed with the China National Intellectual Property Administration (CNIPA) on Sep. 28, 2020, the disclosures of which are hereby incorporated herein by reference in their entireties.

TECHNICAL FIELD

The present application relates to the field of door and window technology, for example, a driving device.

BACKGROUND

A door and window drive structure generally includes a transmission mechanism and a lever handle. The transmission mechanism is driven by the lever handle to move to implement overall transmission of door and window hardware. In the related art, a polygonal shaft is often disposed on the output end of a lever handle. A polygonal groove fitting with the polygonal shaft is disposed on a transmission mechanism fitting with the lever handle. In this manner, the rotation force of the polygonal shaft may be transmitted to the transmission mechanism by enabling the lever handle to rotate, thereby enabling the transmission mechanism to drive the hardware transmission in a door and window device to open or lock. In the process involved, the transmission mechanism not only needs to satisfy the specified itinerary, but also needs to ensure the force on a square shaft hole. Thus, in the related art, the transmission mechanism generally has a large size to satisfy the preceding requirements, and as a result, the occupied space of the transmission mechanism is too large. When the transmission mechanism is mounted on a section bar member, the section bar member must be milled to satisfy mounting requirements. At the same time, a transmission member must be cut off to be mounted at two ends of the transmission mechanism. As a result, the cavity of the section bar member is damaged, and the processing time of the transmission mechanism is greatly increased. A lever handle formed according to the preceding transmission mode usually requires a large mounting space, and at the same time, it is relatively complicated to mount the lever handle on the section bar member. At the same time, in the door and window drive structure, the gear fits with the rack, and the gear fits with the lever handle. As a result, the door and window drive structure has too many fittings, which is not only inconvenient to mount, but also difficult to control the clearance of internal components.

SUMMARY

The present application provides a driving device. The device has a small occupied space, reduces the mounting difficulty and processing and mounting costs of the driving device on a section bar member, and improves the mounting efficiency of the driving device on the section bar member.

An embodiment provides a driving device. The driving device includes a transmission mechanism, a lever handle, and a locking mechanism. The transmission mechanism includes a mounting housing and a movable member. The sidewall of the mounting housing is able to abut against the mounting wall of a section bar member. The mounting housing is able to be disposed on the section bar member. The mounting housing is formed with a sliding groove. Stopper edges are respectively disposed on the tops of two sidewalls of the sliding groove. The movable member is configured to pass through the sliding groove. Two sidewalls of the movable member are respectively provided with engagement strips abutting against the stopper edges. The bottom wall of the movable member is provided with a transmission rack. The lever handle is able to be mounted on a side of the mounting wall. The lever handle includes a handle, a mount, a connection shaft, and a second fastener. An end of the handle is formed with a second mounting groove. The second mounting groove is provided with an internal tooth portion. The mount is disposed in the second mounting groove. The mount is able to be connected to the section bar member. The connection shaft is rotatably disposed in the mount. Two ends of the connection shaft are provided with a first external tooth portion and a second external tooth portion. The first external tooth portion meshes with the internal tooth portion. The second external tooth portion is able to mesh with the transmission rack. The second fastener is configured to pass through the mount. An end of the second fastener is connected to the bottom wall of the second mounting groove. The locking mechanism is able to be configured to pass through the mounting housing and the mounting wall and connected to the mount.

REFERENCE LIST

Figure 1:
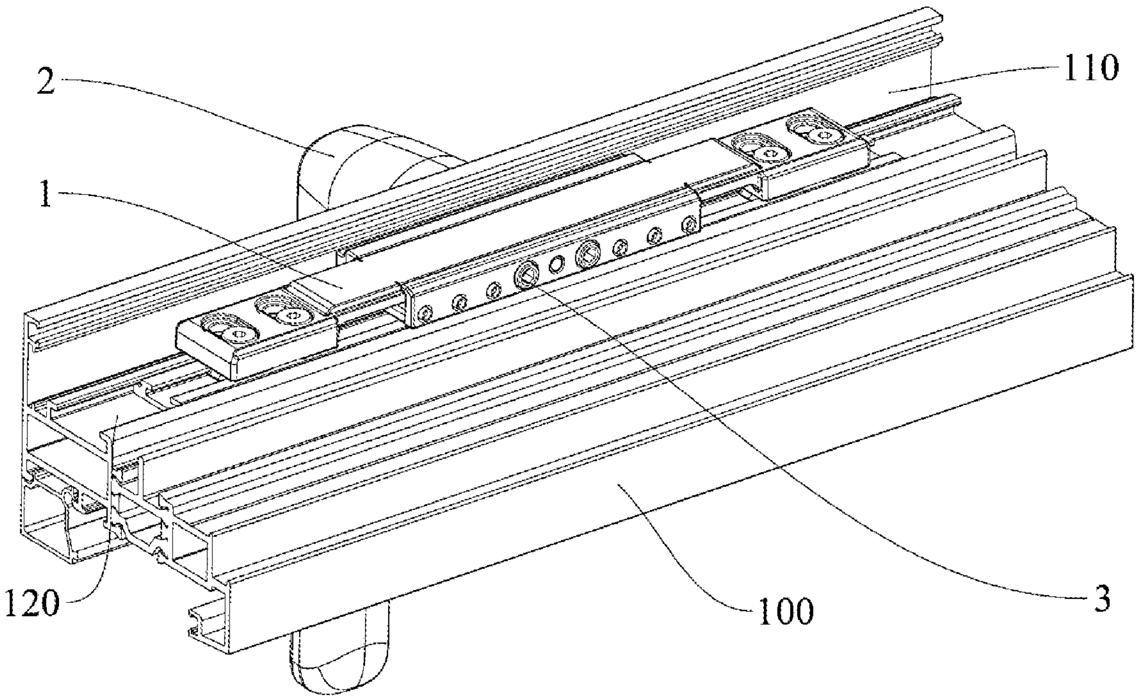
FIG. 1 is a view illustrating the structure of a driving device according to embodiment one of the present application.

100 section bar member
110 mounting wall
120 first mounting groove
130 side edge
140 flange
1 transmission mechanism
11 mounting housing
111 sliding groove
1111 first fitting groove
11111 first fitting section
11112 second fitting section
112 stopper edge
113 first housing
1131 connection protrusion
1132 locking groove
114 second housing
1141 first locking hole
12 movable member
121 engagement strip
122 transmission rack
123 first connection portion
1231 first stopper groove
1232 first limiting protrusion
1233 connection hole
124 bypass groove
13 transmission member
131 connection groove
132 extension edge
133 first engagement block
134 transmission body
1341 second engagement block
135 fitting hole
14 connection assembly
141 first fastener
1411 stop strip
1412 extension protrusion
142 compression assembly
1421 compression member
14211 recess portion
14212 fitting through hole
14213 first communication hole
1422 first connection member
14221 fitting portion
14222 fitting protrusion
143 first fixing member
144 second connection member
1441 engagement end
1442 connection end
1443 fastening protrusion
145 second fixing member
146 second limiting protrusion
15 first elastic member
151 first elastic portion
152 first rigid portion
2 lever handle
21 handle
211 second mounting groove
2111 groove
2112 second connection portion
2113 second stopper groove
22 mount
221 blind hole
222 engagement protrusion
223 second locking hole
224 second fitting groove
2241 third fitting section
2242 fourth fitting section
225 first mounting section
226 second mounting section
23 connection shaft
231 first external tooth portion
232 second external tooth portion
233 rotation section
234 annular groove
235 fitting end
236 connection section
24 second fastener
25 second elastic member
251 second elastic portion
252 second rigid portion
26 positioning member
261 second communication hole
262 positioning port
263 feedback hole
27 mounting base
271 mounting through-hole
272 internal tooth portion
273 stop block
274 positioning column
28 closure member
281 connection shaft hole
2811 stopper portion
29 gasket
3 locking mechanism
31 locking member

DETAILED DESCRIPTION

In the description of the present application, unless otherwise expressly specified and limited, the term "connected to each other", "connected" or "secured" is to be construed in a broad sense, for example, as securely connected, detachably connected, or integrated; mechanically connected or electrically connected; directly connected to each other or indirectly connected to each other via an intermediary; or internally connected between two elements or interaction relations between two elements. For those of ordinary skill in the art, specific meanings of the preceding terms in the present application may be construed according to specific circumstances.

In the present application, unless otherwise expressly specified and limited, when a first feature is described as “on” or “below” a second feature, the first feature and the second feature may be in direct contact or be in contact via another feature between the two features instead of being in direct contact. Moreover, when the first feature is described as “on”, “above” or “over” the second feature, the first feature is right on, above or over the second feature or the first feature is obliquely on, above or over the second feature, or the first feature is simply at a higher level than the second feature. When the first feature is described as “under”, “below” or “underneath” the second feature, the first feature is right under, below or underneath the second feature or the first feature is obliquely under, below or underneath the second feature, or the first feature is simply at a lower level than the second feature.

It is to be understood that the orientation or position relationships indicated by terms “center”, “longitudinal”, “lateral”, “length”, “width”, “thickness”, “above”, “below”, “front”, “back”, “left”, “right”, “vertical”, “horizontal”, “top”, “bottom”, “inside”, “outside”, “clockwise”, “counter-clockwise”, “axial”, “radial”, and “circumferential” are based on the orientation or position relationships shown in the drawings, merely for facilitating description of the present application and simplifying description, and do not indicate or imply that the apparatus or element referred to has a specific orientation and is constructed and operated in a specific orientation, and thus it is not to be construed as limiting the present application. In the description of the present application, unless otherwise noted, the term “a plurality of” or “multiple” means two or more. In addition, the terms “first” and “second” are used only to distinguish between descriptions and have no special meaning.

In the specification, for the content related to a door and window structure, the door and window structure may be a door structure, a window structure, or a door structure and a window structure. This is not limited in embodiments of the present application.

The exemplary structure of a driving device of the embodiments of the present application is described below with reference to FIGS. 1 to 21.

Figure 13:
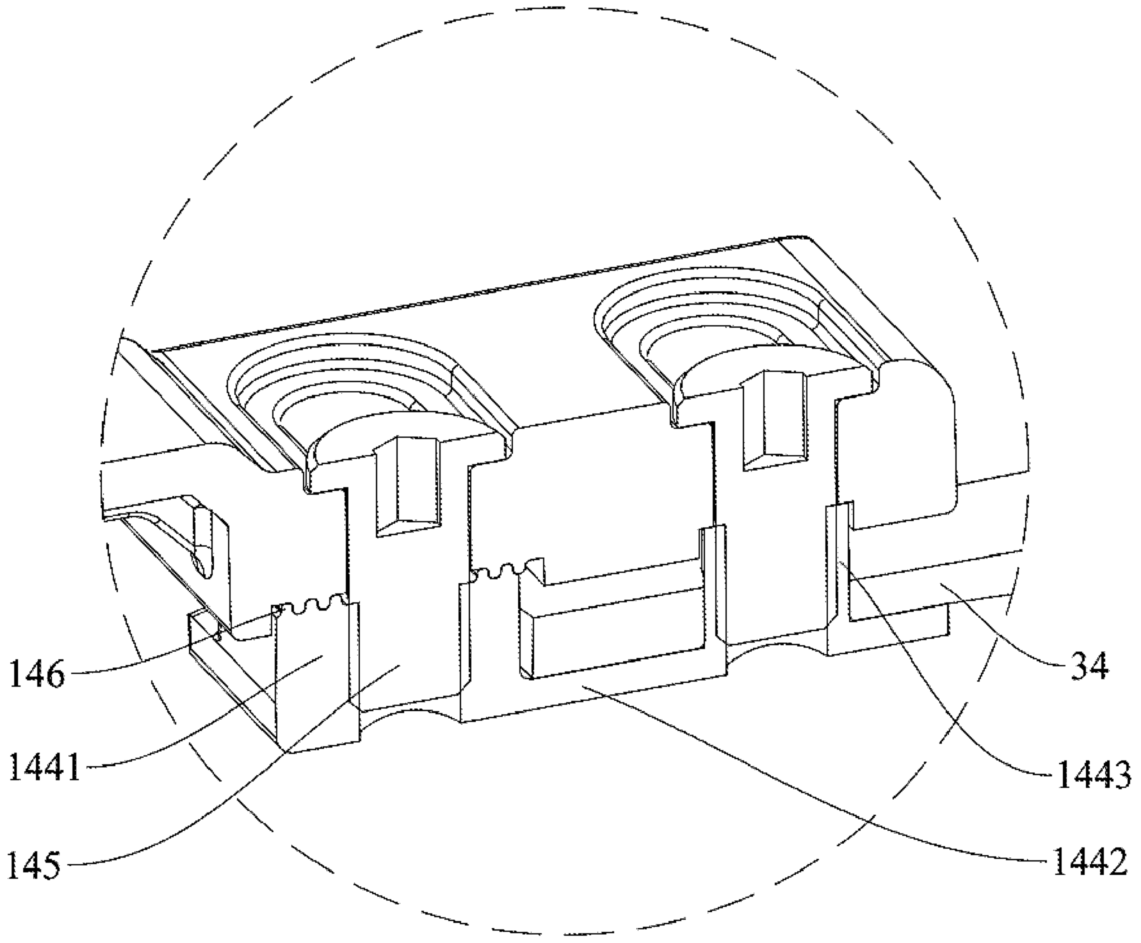
FIG. 13 is a view illustrating the internal structure of another connection assembly and another transmission member according to embodiment two of the present application.
Figure 14:
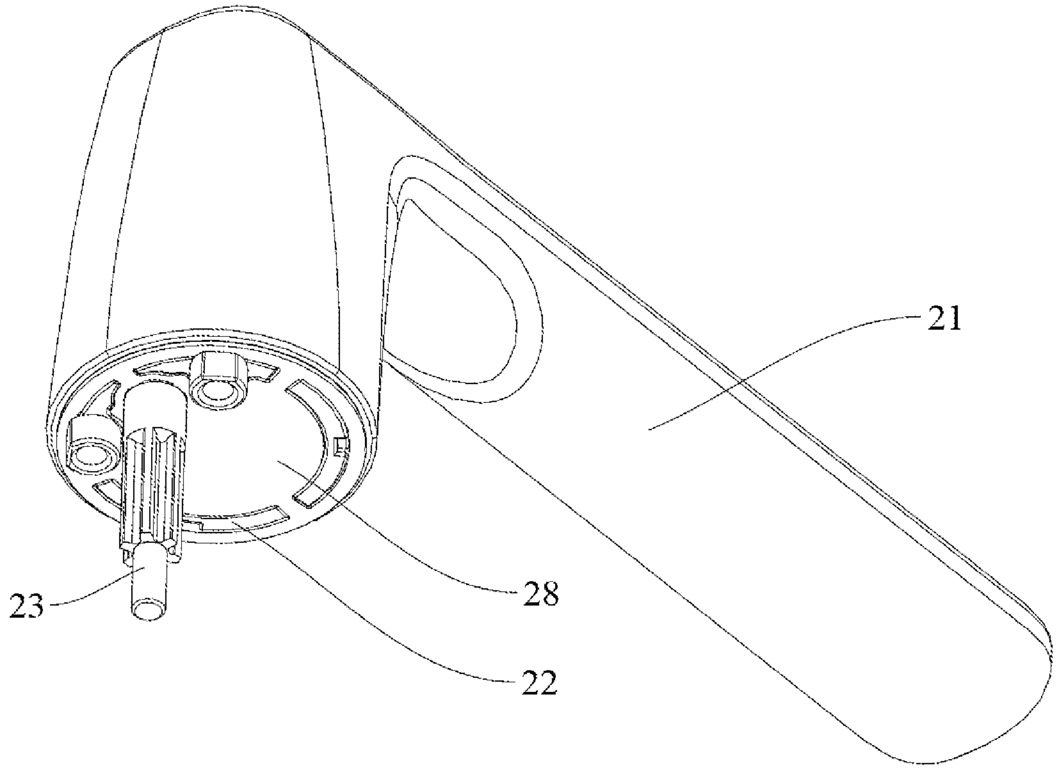
FIG. 14 is a view illustrating the structure of a lever handle according to embodiment one of the present application.
Figure 15:
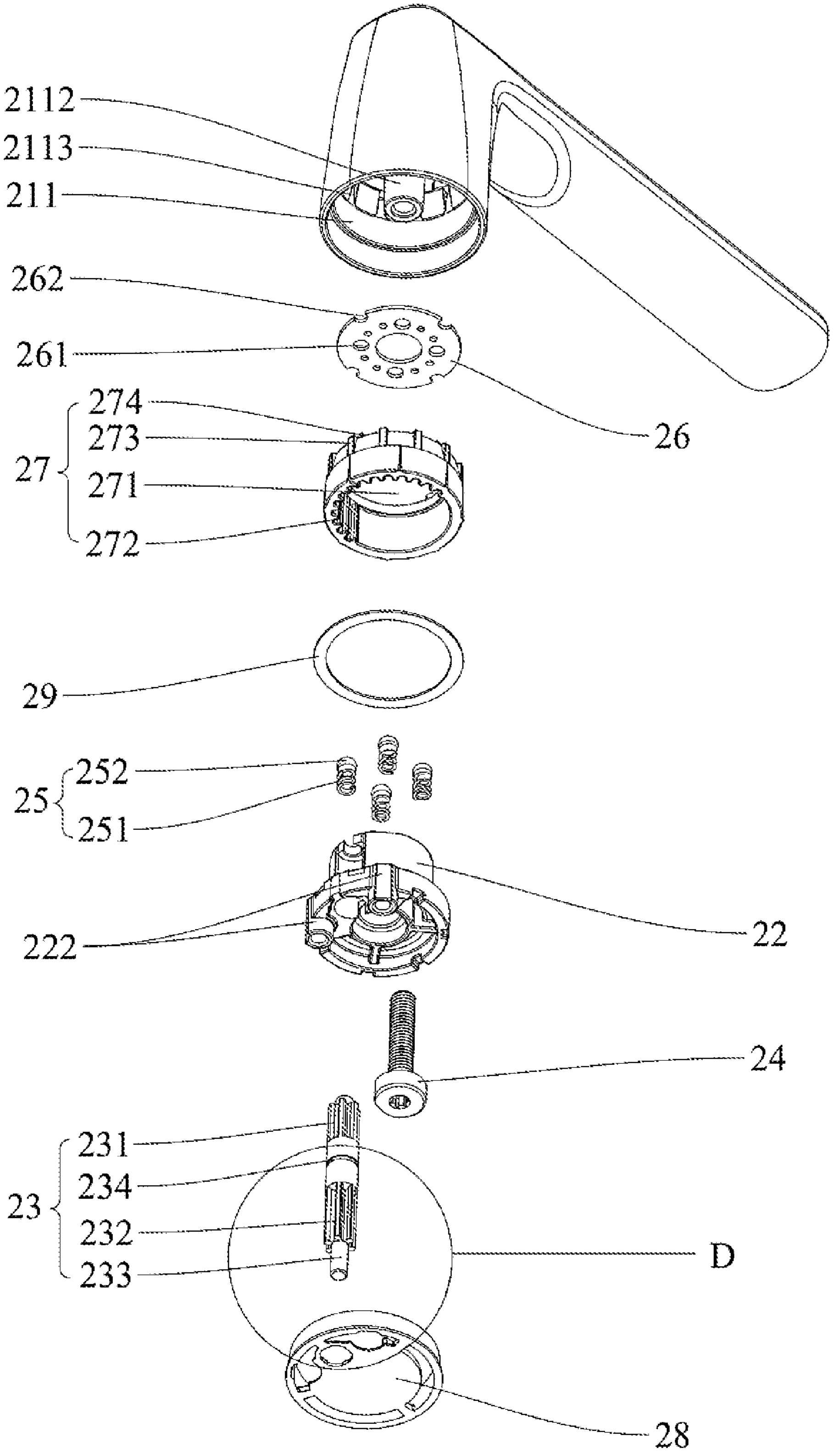
FIG. 15 is an exploded view illustrating the structure of a lever handle according to embodiment one of the present application.

As shown in FIGS. 1 to 21, FIG. 1 discloses a driving device. The driving device includes a transmission mechanism 1, a lever handle 2, and a locking mechanism 3. The transmission mechanism 1 includes a mounting housing 11 and a movable member 12. The sidewall of the mounting housing 11 is able to abut against the mounting wall 110 of a section bar member 100. The mounting housing 11 is able to be disposed on the section bar member 100. The mounting housing 11 is formed with a sliding groove 111. Stopper edges 112 are respectively disposed on the tops of two sidewalls of the sliding groove 111. The movable member 12 is configured to pass through the sliding groove 11. Two sidewalls of the movable member 12 are respectively provided with engagement strips 121 abutting against the stopper edges 112. The bottom wall of the movable member 12 is provided with a transmission rack 122. The lever handle 2 is able to be mounted on another side of the mounting wall 110. Referring to FIGS. 14 and 15, the lever handle 2 includes a handle 21, a mount 22, a connection shaft 23, and a second fastener 24. An end of the lever handle 2 is formed with a second mounting groove 211. The second mounting groove 211 is provided with an internal tooth portion 272. The mount 22 is disposed in the second mounting groove 211. The mount 22 is able to be connected to the section bar member 100. The connection shaft 23 is rotatably disposed in the mount 22. Two ends of the connection shaft 23 are provided with a first external tooth portion 231 and a second external tooth portion 232. The first external tooth portion 231 meshes with the internal tooth portion 272. The second external tooth portion 232 is able to mesh with the transmission rack 122. The second fastener 24 is configured to pass through the mount 22. An end of the second fastener 24 is connected to the bottom wall of the second mounting groove 211. The locking mechanism 3 is able to be configured to pass through the mounting housing 11 and the mounting wall 110 and connected to the mount 22.

The stopper edges 112 and the second connection portion 2112 are able to stop the movable member 12 configured to pass through the sliding groove 111, so that the distance between the movable member 12 and the bottom wall of the sliding groove 111 are able to be adjusted according to actual requirements, and the movable member 12 is able to move only in the length direction of the sliding groove 111, thereby ensuring the driving effect of the lever handle 2 on the movable member 12. The bottom wall of the movable member 12 is provided with the transmission rack 122. The connection shaft 23 of the lever handle 2 is provided with the second external tooth portion 232 meshing with the transmission rack 122. When the handle 21 rotates on the mount 22, the internal tooth portion 272 is able to rotate with the rotation of the second mounting groove 211. When the internal tooth portion 272 rotates, the internal tooth portion 272 is able to drive the first external tooth portion 231 meshing with the internal tooth portion 272 to rotate. When the first external tooth portion 231 rotates, the connection shaft 23 is able to rotate relative to the mount 22. The second external tooth portion 232 is also able to rotate with the rotation of the connection shaft 23, so that the transmission mechanism 1 does not need additional gear structure, and the second external tooth portion 232 meshes with the transmission rack 122 to implement the movement of the movable member 12 driven by the lever handle 2. A transmission shaft directly drives the movable member 12 to move, thereby improving the transmission reliability between the lever handle 2 and the transmission mechanism 1 and reducing the jamming phenomenon between the lever handle 2 and the transmission mechanism 1.

The mount 22 is disposed in the second mounting groove 211 and connected to the section bar member 100, so that the mount 22 is able to be fixedly connected to the section bar member 100. The second fastener 24 is configured to pass through a second locking hole 223 in the mount 22 and connected to the bottom wall of the second mounting groove 211, so that the handle 21 is able to firmly and reliably sleeve the mount 22 through the second fastener 24, and there is only a small clearance between the notch of the second mounting groove 211 and the section bar member 100. Thus, a base used for fixing the handle 21 to the section bar member 100 does not need to be additionally provided. The transmission mechanism 1 is no longer provided with gears and other structures that occupy a large space, so that the thickness of the movable member 12 in the driving device, the thickness of the mounting housing 11, and the spacing between the movable member 12 and the mounting housing 11 can be adjusted according to actual requirements. At the same time, there is a small volume between the second mounting groove 211, the mount 22, and the connection shaft 23, so that the lever handle 2 and the transmission mechanism 1 can be mounted on the section bar member 100 in a small space, and the movable member 12 is able to also be moved in a first mounting groove 120 under the drive of the lever handle 2 when the movable member 12 has a small height.

During the mounting process of the transmission mechanism 1, the transmission member 13 is slidably engaged in the first mounting groove 120 so that the transmission member 13 may not have a relative displacement in the vertical direction relative to the first mounting groove 120. The movable member 12 is slidably configured to pass through the sliding groove 11 so that the movable member 12 may not have a relative displacement in the vertical direction relative to the mounting housing 11. At the same time, two ends of the movable member 12 are connected to the transmission member 13 so that the mounting housing 13 may not have a relative displacement in the vertical direction relative to the first mounting groove 120.

The locking mechanism 3 is configured to pass through the mounting housing 11 and a mounting wall 110 and connected to the lever handle 2, so that the mounting housing 11 is able to be stably and reliably connected to the mounting wall 110 and firmly disposed on two flanges 140 of the first mounting groove 120. Moreover, the possibility of relative displacement of the mounting housing 11 with respect to the connection shaft 23 is able to be reduced, and the movable member 12 is able to move reliably under the drive of the lever handle 2.

According to the driving device according to this embodiment, since the transmission mechanism 1 has a small height, and the mounting housing 11 is disposed on the flanges 140 of the first mounting groove 120, the occupied space of the transmission structure is reduced. Thus, there is no need to use the space of the first mounting groove 120 and the space of the section bar member 100 located below the first mounting groove 120, and the mounting housing 11 can be firmly disposed on the two flanges 140 of the first mounting groove 120. At the same time, the mounting structure in the second mounting groove 211 is simple and compact, so that the lever handle 2 can be firmly mounted on the section bar member 100. The second external tooth portion 232 is disposed on the connection shaft 23, so that the volume of the lever handle 2 and the volume of the transmission mechanism 1 can be reduced, and the lever handle 2 can drive the transmission mechanism 1 to move. Moreover, the lever handle 2 can be adapted to a mounting occasion of a small space, so that the driving device can be mounted without damaging the section bar member 100 and has a small mounting space requirement. Thus, during the mounting and use of the driving device of this embodiment, even when the height of the mounting wall 110 is limited, it is not necessary to perform additional processing on the section bar member 100 to form a large mounting space for the transmission mechanism 1, thereby ensuring the strength of the section bar member and reducing the mounting difficulty and the processing costs. The mounting housing 11, the movable member 12, and the locking mechanism 3 do not need to occupy the space of the first mounting groove 120, so that the transmission member 13 may be directly fitted in the first mounting groove 120. The transmission member 13 does not need to be cut off to be connected to two ends of the movable member 12 respectively, so that the mounting efficiency of the driving device on the section bar member 100 can be improved. In the actual application of the transmission mechanism 1 of this embodiment, according to actual requirements, one transmission member 13 may be used, or multiple transmission members 13 may be used. In addition, since in the driving device according to this embodiment, the transmission rack 122 disposed on the movable member 12 fits with the connection shaft 23 of the lever handle 2, it is not necessary to additionally dispose other gear and rack structures inside the transmission mechanism 1. On the premise that the driving effect of the lever handle 2 on the transmission mechanism 1 is ensured, the number of internal fittings of the driving device is effectively reduced, and the assembly clearance between the internal fittings of the driving device is conveniently reduced.

Figure 7:
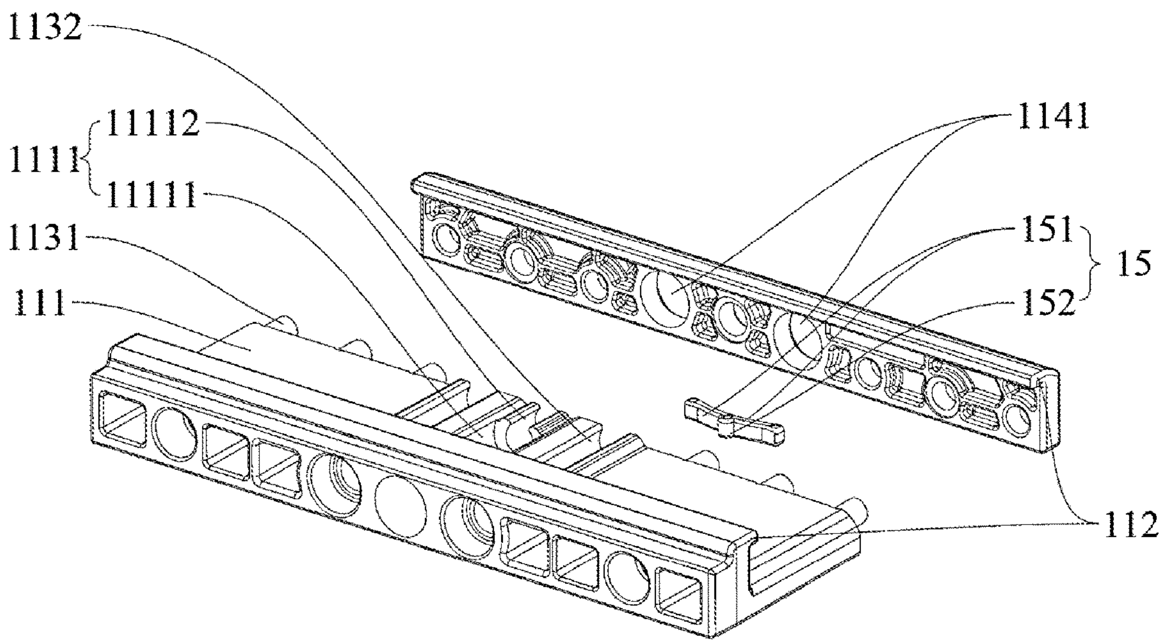
FIG. 7 is an exploded view illustrating the structure of a mounting housing and an elastic member according to embodiment one of the present application.
Figure 8:
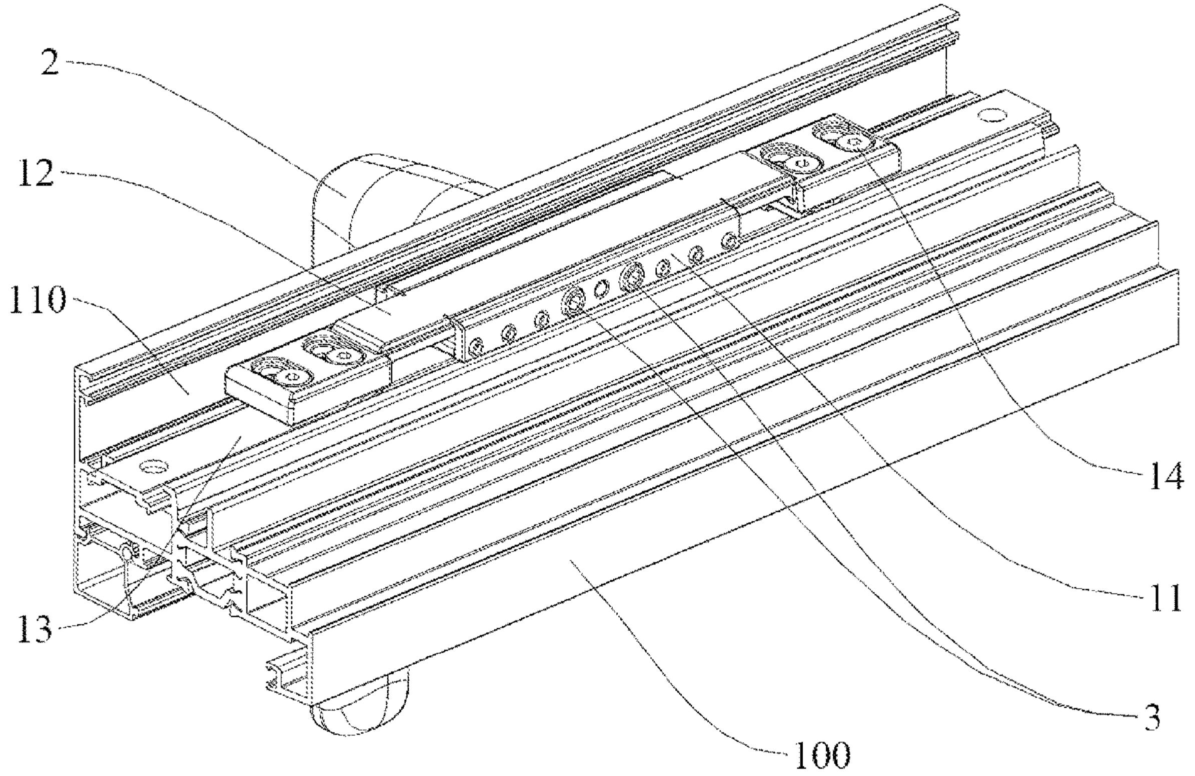
FIG. 8 is a view illustrating the structure of a driving device according to embodiment two of the present application.
Figure 9:
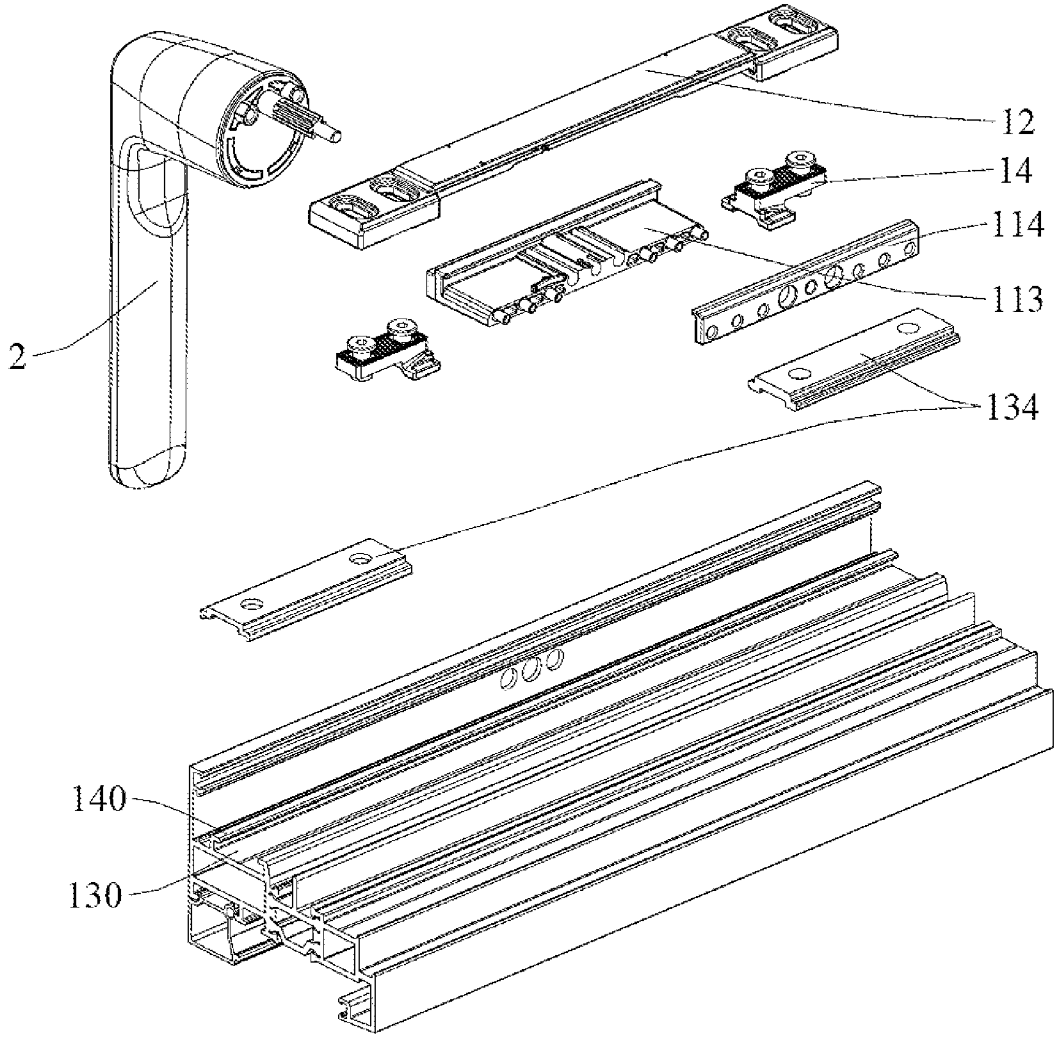
FIG. 9 is an exploded view illustrating the structure of a driving device according to embodiment two of the present application.

In some exemplary embodiments, as shown in FIG. 7, the stopper edge 112 on one of the two sidewalls of the sliding groove 111 extends in a direction facing the other sidewall.

With the preceding structure, a reliable stop structure can be formed on the mounting housing 11. At the same time, the movable member 12 is engaged between the stopper edges 112 and the bottom wall of the sliding groove 111, so that the overall height after the mounting housing 11 fits with the movable member 12 can be reduced.

In other embodiments of the present application, the stopper edge 112 on one of the two sidewalls of the sliding groove 111 may extend in a direction away from the other sidewall. At this time, the movable member 12 is disposed on the mounting housing 11. The engagement strips 121 on the movable member 12 is also able to abut against the bottom walls of the stopper edges 112. In this manner, the mounting housing 11 stops the movable member 12 in the vertical direction. The specific structures of the stopper edges 112 on the mounting housing 11, the specific structures of the engagement strips 121 on the movable member 12, and the stop fitting between the stopper edges 112 and the engagement strips 121 may be determined according to actual requirements. This is not specifically limited in other embodiments of the present application.

Figure 2:
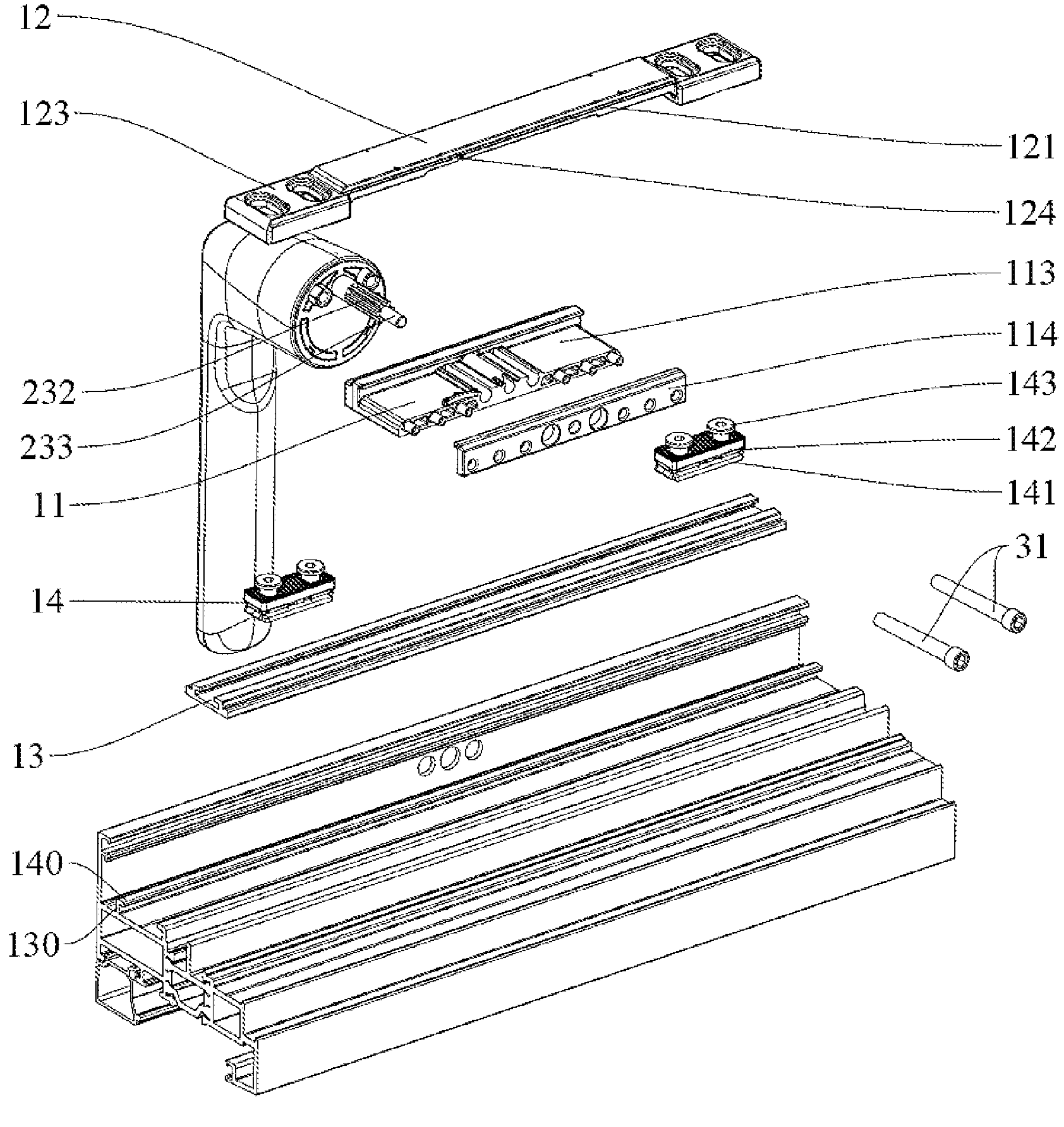
FIG. 2 is an exploded view illustrating the structure of a driving device according to embodiment one of the present application.

In some embodiments, as shown in FIGS. 1 and 2, the transmission mechanism 1 also includes a connection assembly 14. The movable member 12 is provided with a first connection portion 123. Each first connection portion 123 sleeves the connection assembly 14. The connection assembly 14 can be connected to a first connection portion 123 and a transmission member 13.

The connection assembly 14 is configured to facilitate the connection of the movable member 12 to the transmission member 13 having different structures, so that the transmission mechanism 1 has a high applicability. In addition, the first connection portion 123 sleeved on the connection member 14 is able to reduce the possibility of the relative displacement between the movable member 12 and the connection member 14 in the vertical direction, so that the connection relationship between the movable member 12, the connection member 14, and the transmission member 13 is more stable and reliable.

The mounting housing 11, the movable member 12, and a locking assembly do not need to occupy the space of the first mounting groove 120, so that the transmission member 13 may be directly fitted in the first mounting groove 120. The transmission member 13 does not need to be cut off to be connected to two ends of the movable member 12 respectively, so that the mounting efficiency of the transmission mechanism 1 on the section bar member 100 can be improved. In the actual application of the transmission mechanism 1 of this embodiment, according to actual requirements, one transmission member 13 may be used, or multiple transmission members 13 may also be used. In addition, in other embodiments of the present application, the mounting housing 11, the movable member 12, and the transmission member 13 may also be directly disposed on the surface of the section bar member 100. The mounting positions of the mounting housing 11 and the movable member 12 on the section bar member 100 are not limited to the first mounting groove 120 described in this embodiment. For example, when the mounting housing 11 and the movable member 12 are directly mounted on the flat surface of the section bar member 100, the transmission member 13 is also able to be slidably connected to a boss disposed on the section bar member 100. In an embodiment, the first mounting groove 120 has two side edges 130. The top wall of each side edge 130 is provided with a flange 140 extending toward the other side edge 130, so that the transmission member 13 is slidably engaged in the first mounting groove 120. In other embodiments of the present application, the specific structure of the first mounting groove 120 is not limited to the preceding description and does not need to be specifically limited.

In an exemplary embodiment, in this embodiment, the section bar member 100 is formed with the first mounting groove 120. The transmission member 13 is able to be slidably engaged in the first mounting groove 120 so that the transmission member 13 may not have a relative displacement in the vertical direction relative to the first mounting groove 120. In other embodiments of the present application, the transmission member 13 is also able to fit with the section bar member 100 through other structures. This does not need to be specifically limited in the embodiments.

Figure 3:
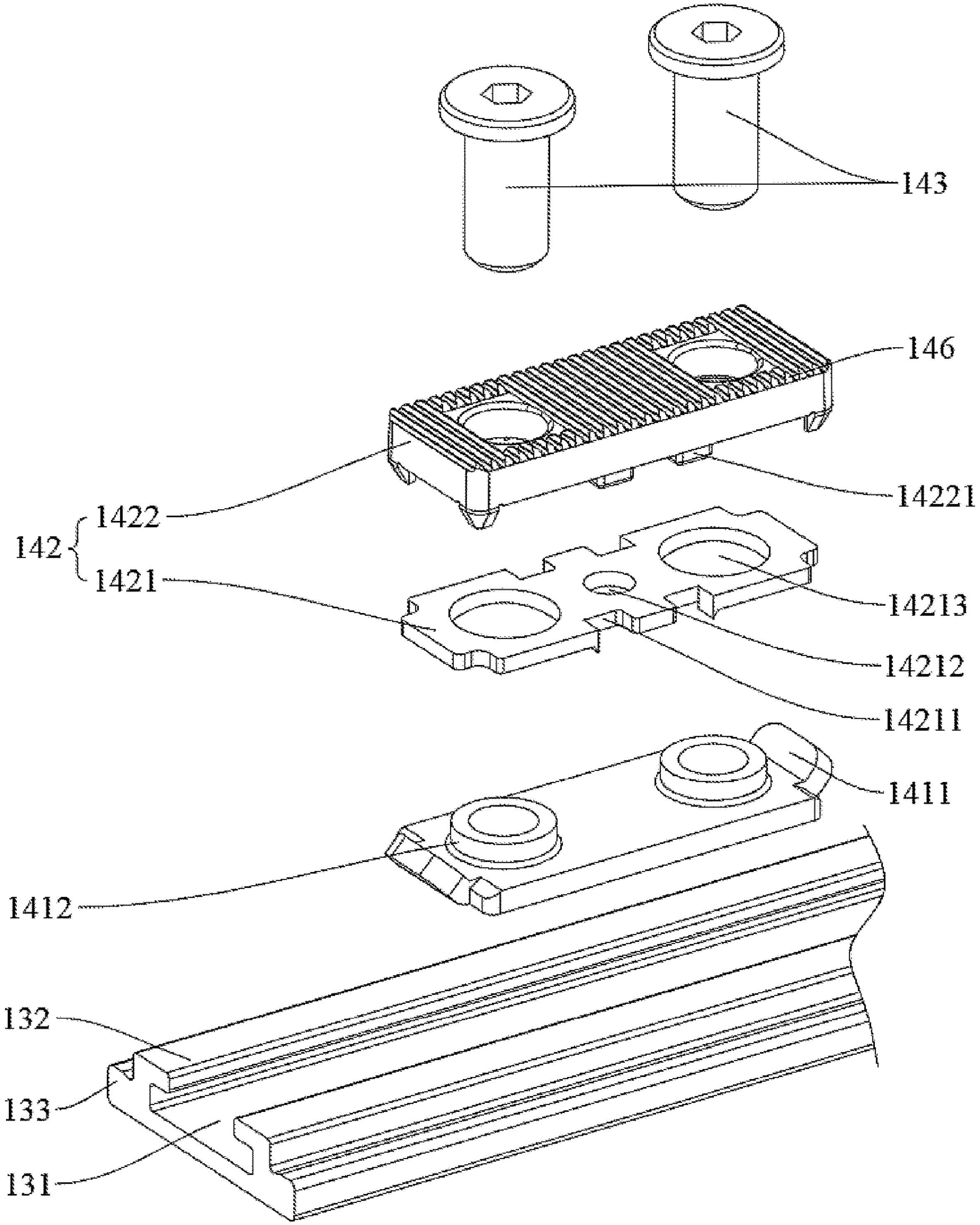
FIG. 3 is an exploded view illustrating the structure of a connection assembly and a transmission member according to embodiment one of the present application.
Figure 6:
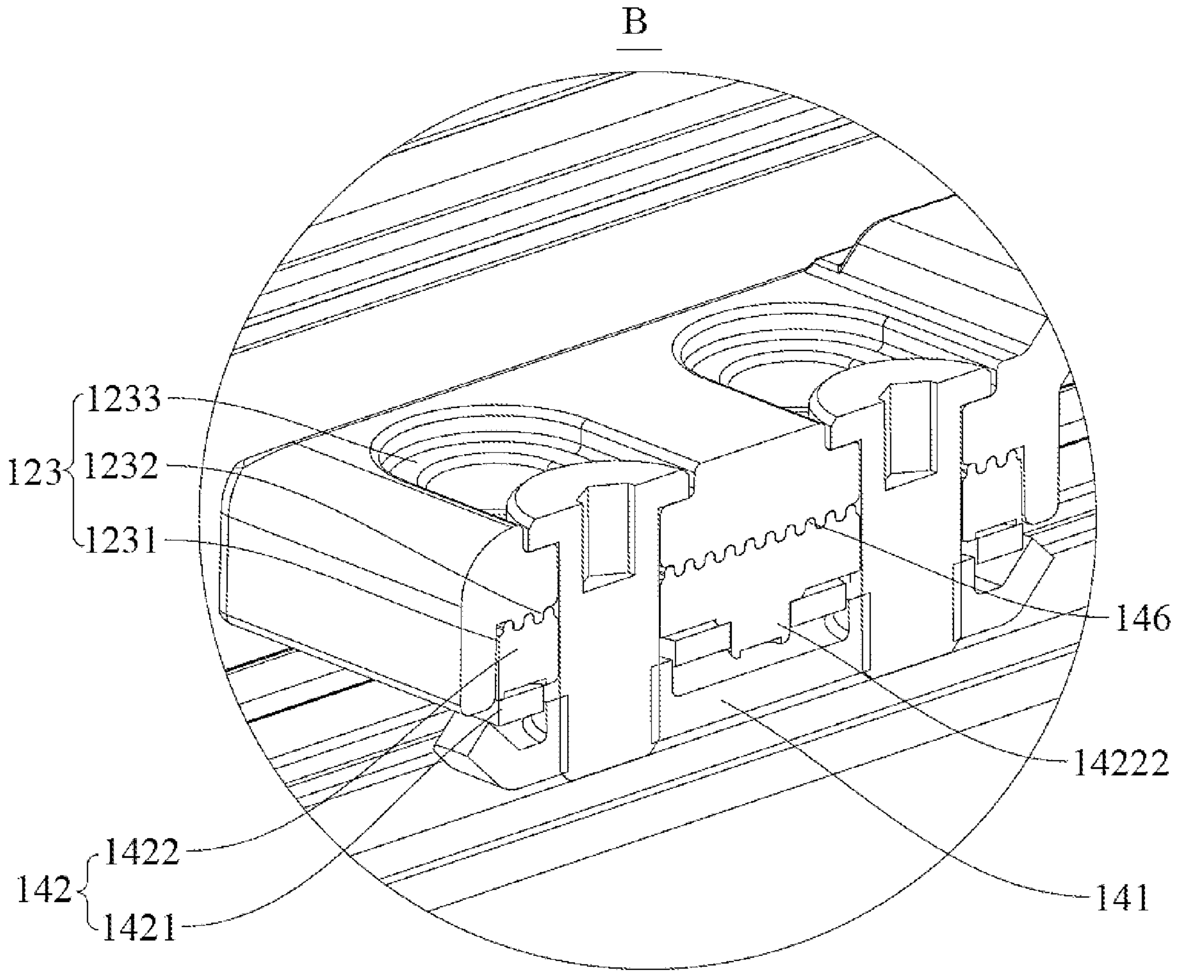
FIG. 6 is an enlarged partial view illustrating the structure of part B of FIG. 4.

In some embodiments, as shown in FIGS. 3 and 6, the connection assembly 14 includes a first fastener 141, a compression assembly 142, and a first fixing member 143. The first fastener 141 is able to be slidably engaged in a connection groove 131 of the transmission member 13 in a length direction. The compression assembly 142 can be disposed on the top wall of the transmission member 13. The compression assembly 142 is able to fit with the first fastener 141 and clamp the transmission member 13. The first fixing member 143 is configured to pass through the first connection portion 123, the compression assembly 142, and the first fastener 141 and connected to the first fastener 141.

The first fastener 141 is engaged in the connection groove 131. The first fixing member 143 is configured to pass through the first connection portion 123, the compression assembly 142, and the first fastener 141 and connected to the first fastener 141, so that the first fastener 143 is able to simultaneously stop the displacement of the first connection portion 123, the compression assembly 142, and the first fastener 141 in the horizontal direction and the vertical direction, thereby ensuring a stable connection between the first connection portion 123, the compression assembly 142, and the first fastener 141. At the same time, the compression assembly 142 is able to fit with the first fastener 141 and clamp the transmission member 13. The first fixing member 143 configured to pass through the compression assembly 142 and the first fastener 141 are also able to apply a fastening force in the vertical direction to the compression assembly 142 and the first fastener 141. In this manner, it is ensured that the compression assembly 142 can firmly clamp the transmission member 13 with the first fastener 141, so that the connection assembly 14 can be firmly connected to the transmission member 13. Thus, in this embodiment, the connection assembly 14 can firmly connect the first connection portion 123 and the transmission member 13, thereby improving the transmission reliability of the transmission mechanism 1.

In this embodiment, since the transmission member 13 is formed with the connection groove 131 disposed in the length direction of the transmission member 13, the spacing between the movable member 12 and the bottom wall of the connection groove 131 is large. Thus, the connection assembly 14 can have a large mounting space in the vertical direction, so that the transmission member 13 and the movable member 12 are able to be firmly clamped only in the vertical direction by the structure of the connection assembly 14 of this embodiment. Since the connection assembly 14 does not need to occupy the position space in the horizontal direction of the transmission member 13, the transmission member 13 is able to be engaged in the section bar member 100 and connected to the movable member 12 through the connection assembly 14 at different positions at two ends. That is, in this embodiment, the transmission member 13 can be assembled without cutting, thereby improving the applicability of the transmission mechanism 1. The transmission member 13 having the structure of this embodiment can also be cut into two sections or directly connected to two ends of the movable member 12 by using two sections of the transmission member 13. Whether the transmission member 13 is cut or not may be determined according to actual requirements.

In this embodiment, the transmission member 13 is slidably engaged in the section bar member 100. The first fastener 141 is engaged in the connection groove 131. The section bar member 100 is formed with the first mounting groove 120. Each of two sidewalls of the connection groove 131 is provided with an extension edge 132 disposed toward the other sidewall. Two sides of the transmission member 13 are provided with first engagement blocks 133 engaged with the first mounting groove 120. With the preceding structure, the transmission member 13 is slidably engaged in the section bar member 100. At the same time, the first fastener 141 is engaged in the connection groove 131. In other embodiments of the present application, the connection relationship between the transmission member 13 and the section bar member 100 and the connection relationship between the first fastener 141 and the transmission member 13 may be implemented by other engagement structures. This does not need to be specifically limited in the embodiments.

For example, the first fixing member 143 may be configured as a screw or a bolt.

In an exemplary embodiment, as shown in FIGS. 3 and 6, there are multiple first fixing members 143. The multiple first fixing members 143 are disposed at intervals in the length direction of the movable member 12. The multiple first fixing members 143 are configured to improve the connection stability between the connection assembly 14 and the transmission member 13.

In some exemplary embodiments, as shown in FIGS. 3 and 6, each of two ends of the first fastener 141 is provided with a stop strip 1411. Each stop strip 1411 extends in a direction away from the other stop strip 1411 in a direction away from the transmission member 13. With the preceding structure, the first fastener 141 can be accurately extended into the connection groove 131, and the connection assembly 14 can be positioned on the connection groove 131.

In some exemplary embodiments, as shown in FIGS. 3 and 6, the compression assembly 142 includes a compression member 1421 and a first connection member 1422. The compression assembly 1421 is able to be disposed on the transmission member 13. A recess portion 14211 is formed on the peripheral wall of the compression member 1421. The first connection member 1422 is disposed on the compression member 1421. The first connection member 1422 is provided with a fitting portion 14221 engaged in the recess portion 14211.

With the preceding structure, the mounting of the compression assembly 142 on the transmission member 13 can be facilitated. The fitting of the recess portion 14211 with the fitting portion 14221 can reduce the possibility of relative displacement of the compression member 1421 and the first connection member 1422 in the horizontal direction, thereby improving the connection stability between the compression member 1421 and the first connection member 1422. In some embodiments, the compression member 1421 and the first connection member 1422 may also be integrally disposed on the movable member 12. This is not limited in the embodiments.

In some exemplary embodiments, as shown in FIGS. 3 and 6, the compression member 1421 is provided with a fitting through hole 14212. The bottom wall of the first connection member 1422 is provided with a fitting protrusion 14222 configured to pass through the fitting through hole 14212. With the preceding structure, the connection relationship between the compression member 1421 and the first connection member 1422 can be strengthened.

In some exemplary embodiments, as shown in FIGS. 3 and 6, the compression member 1421 is formed with a first communication hole 14213. Each first communication hole 14213 corresponds to a first fixing member 143. The first fastener 141 is provided with an extension protrusion 1412 extending toward a direction adjacent to the compression member 1421. Each extension protrusion 1412 corresponds to a first communication hole 14213. The extension protrusion 1412 extends into the first communication hole 14213. The first fixing member 143 is threadedly connected to the extension protrusion 1412. With the preceding structure, the connection relationship between the compression member 1421 and the first fastener 1422 can be strengthened.

In some embodiments, as shown in FIGS. 9 to 13, the connection assembly 14 includes a second connection member 144 and a second fixing member 145. The bottom wall of the second connection member 144 is provided with a fastening protrusion 1443. The fastening protrusion 1443 is able to be configured to pass through a fitting hole 135 in the transmission member 13. The second fixing member 145 is configured to pass through the first connection portion 123 and connected to the second connection member 144.

The second connection member 144 is firmly connected to the first connection portion 123 through the second fixing member 145. At the same time, the first connection portion 123 cannot be displaced relative to the mounting housing 11 in the vertical direction, so that the second connection member 144 cannot be displaced relative to the first connection portion 123 in the vertical direction. The mounting housing 11 is firmly connected to the mounting wall 110 of the section bar member 100, so that neither the second connection member 144 nor the transmission member 13 may be displaced relative to the section bar member 100 in the vertical direction after the transmission member 13 is connected to the movable member 12. At this time, since the fastening protrusion 1443 is able to be configured to pass through the fitting hole 135, the second connection member 144 is connected to the transmission member 13, that is, the movable member 12 is firmly connected to the transmission member 13, thereby improving the transmission reliability of the transmission mechanism 1.

In this embodiment, since the connection between the second connection member 144 and the transmission member 13 is formed by the fitting between the fastening protrusion 1443 and the fitting hole 135, in the actual mounting process, the transmission member 13 can determine whether the transmission member 13 needs to be cut off according to actual requirements. Even if there is a small clearance between the top wall of the transmission member 13 and the first connection portion 123, the transmission member 13 can be firmly connected to the movable member 12 on the premise that there is no need to additionally cut off the transmission member 13. That is, in this embodiment, the transmission member 13 can be assembled without cutting, thereby improving the applicability of the transmission mechanism 1.

In some exemplary embodiments, as shown in FIGS. 9 to 12, the bottom wall of the second connection member 144 is able to abut against the top wall of the transmission member 13. The bottom wall of the second connection member 144 is provided with the fastening protrusion 1443. With the preceding structure, the second connection member 144 can be disposed between the first connection portion 123 and the transmission member 13, so that the mounting of the connection assembly 14 can be facilitated, and the overall height of the transmission mechanism 1 can be reduced. Moreover, the connection stability between the second connection member 144 and the first connection portion 123 can be improved. In other embodiments of the present application, as shown in FIG. 13, the second connection member 144 can be spaced apart from the first connection portion 123 so that the transmission member 13 can be disposed between the second connection member 144 and the first connection portion 123, thereby improving the connection stability of the transmission member 13 between the connection member 14 and the first connection portion 123.

In some exemplary embodiments, the second connection member 144 is integrally formed with the first connection portion 123. It is to be understood that the second connection member 144 is integrally formed with the first connection portion 123 to enhance the connection stability when the first connection portion 123 and the second connection member 144 are connected to the transmission member 13, thereby improving the transmission reliability of the transmission mechanism 1. Of course, in other embodiments of the present application, the second connection member 144 and the first connection portion 123 may be configured as mutually independent structures, so that the mounting of the transmission mechanism 1 can be facilitated.

For example, the second fixing member 145 may be configured as a screw or a bolt.

Figure 10:
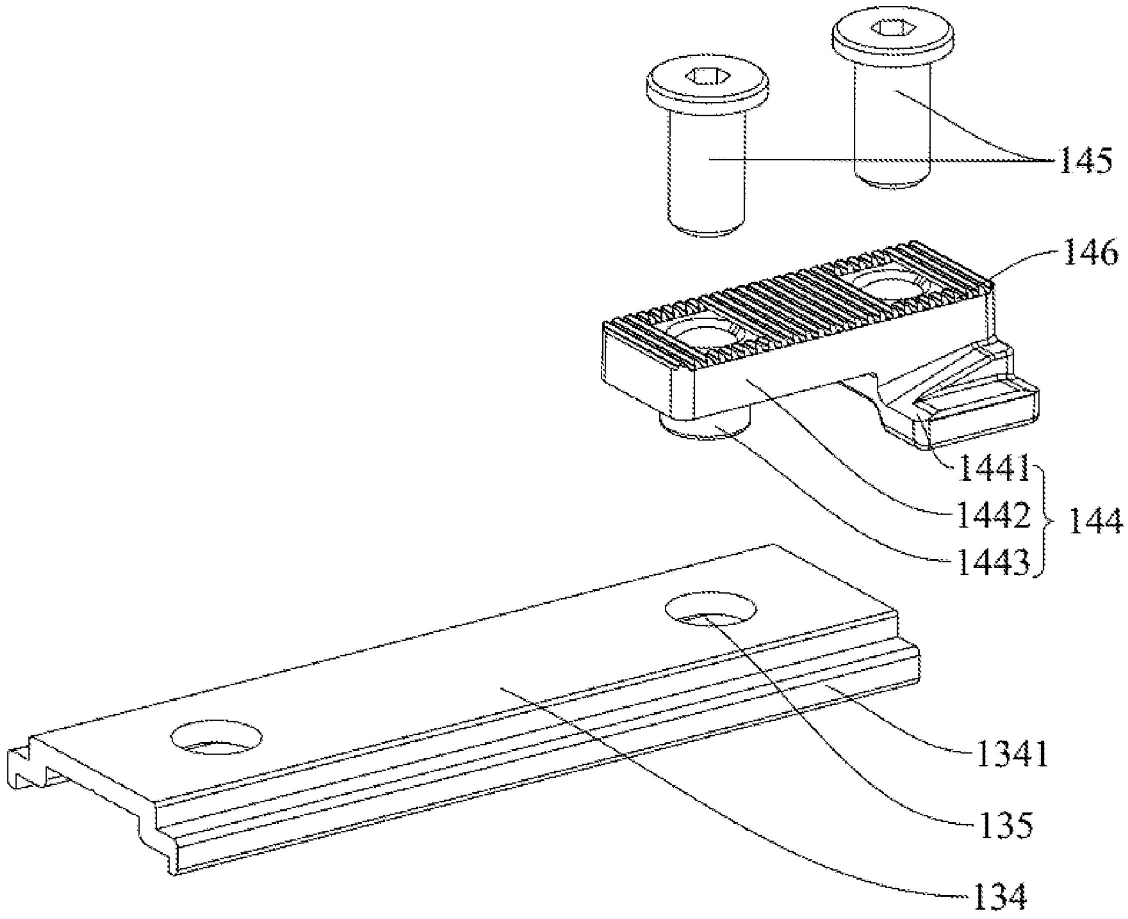
FIG. 10 is an exploded view illustrating the structure of a connection assembly and a transmission member according to embodiment two of the present application.
Figure 11:
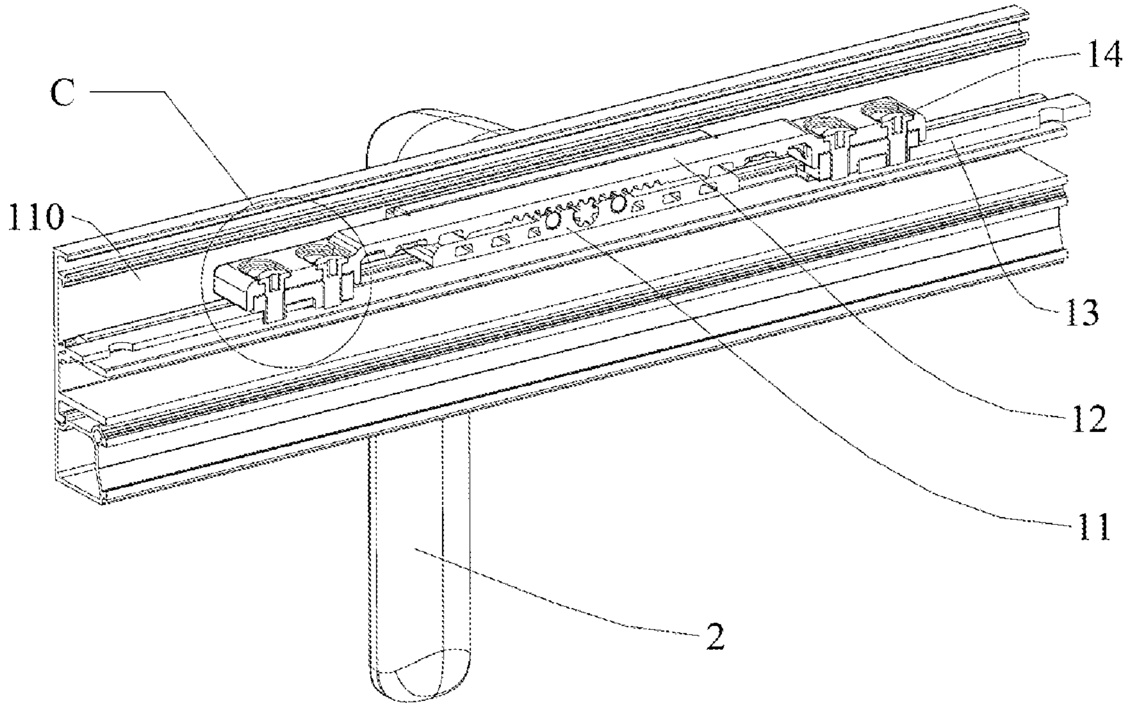
FIG. 11 is a view illustrating the internal structure of a driving device according to embodiment two of the present application.
Figure 12:
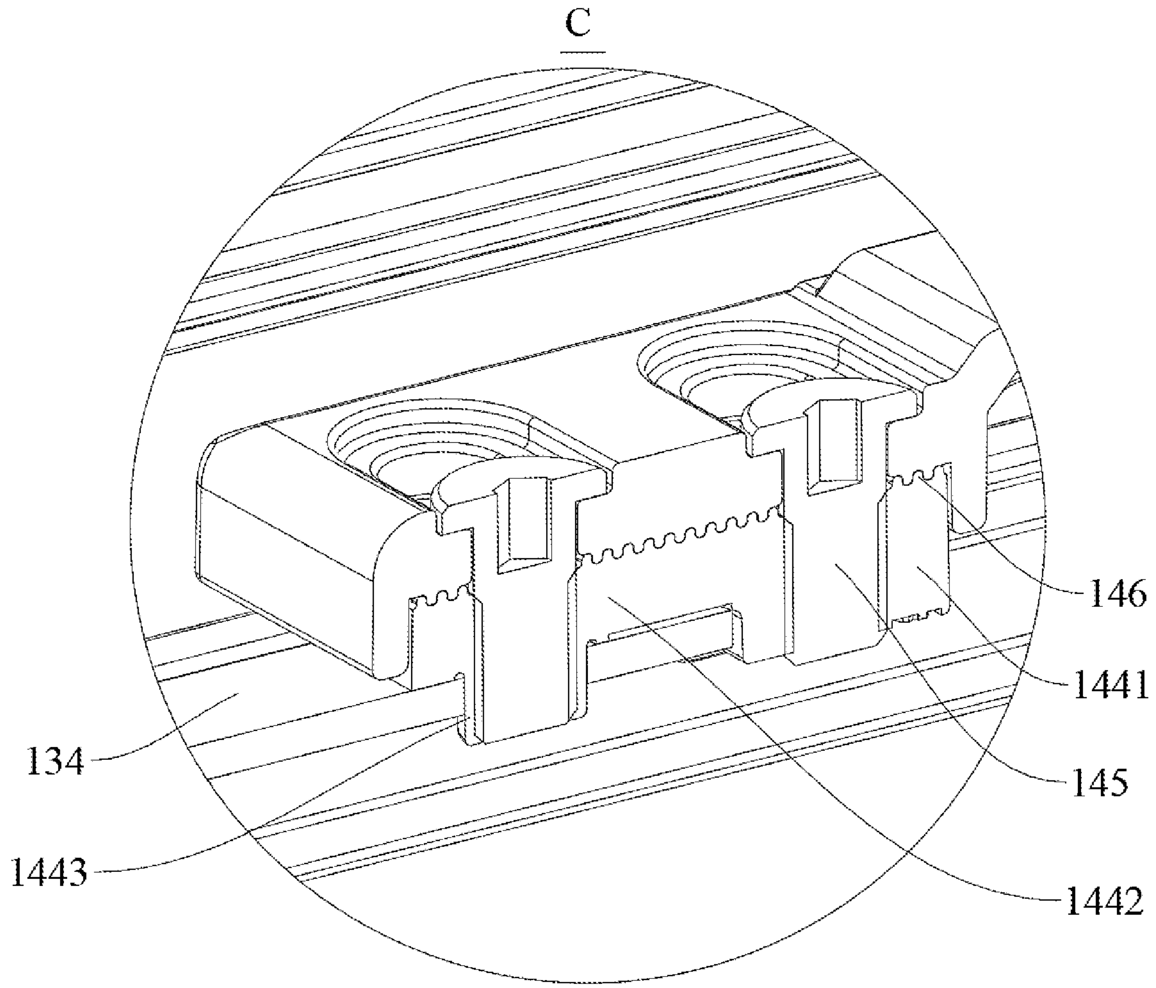
FIG. 12 is an enlarged partial view illustrating the structure of part C of FIG. 11.

In an exemplary embodiment, as shown in FIGS. 10 and 12, there are multiple second fixing members 145. The multiple second fixing members 145 are disposed at intervals in the length direction of the movable member 12. The multiple second fixing members 145 are configured to improve the connection stability between the connection assembly 14 and the transmission member 13.

In some embodiments, the second connection member 144 includes an engagement end 1441 and a connection end 1442. The engagement end 1441 is able to be slidably engaged in the section bar member 100. The connection end 1442 is connected to the engagement end 1441. The fastening protrusion 1443 is disposed on the connection end 1442.

The engagement end 1441 is able to be slidably engaged in the section bar member 100. At the same time, the second connection member 144 is connected to the first connection portion 123 through the second fixing member 145, so that when the transmission mechanism 1 is integrally mounted on the section bar member 100 and is not connected to the transmission member 13, the transmission mechanism 1 can still be mounted on the section bar member 100 under the stop of the engagement end 1441, thereby avoiding the phenomenon that the transmission mechanism 1 falls off from the section bar member 100 and facilitating the fast and firm connection between the movable member 12 with the transmission member 13. In addition, the connection end 1442 is disposed on the transmission member 13 and connected to the transmission member 13. The connection end 1442 may be configured to pass through the transmission member 13 and connected to the transmission member 13, or the connection end 1442 may be connected to the transmission member 13 by a connection structure. The connection relationship between the connection end 1442 and the transmission member 13 may be determined according to actual requirements. This is not limited in the embodiments.

In this embodiment, since the second connection member 144 includes the engagement end 1441. At the same time, each of the end faces of the two engagement ends 1441 abuts against the end face of a transmission member 13, and each of the first connection portions 123 at two ends of the movable member 12 is connected to a transmission member 13 through the connection assembly 14, it is possible to improve the connection stability between the transmission member 13 and the first connection portion 123. At the same time, in consideration of the cutting processing of the transmission member 13 and the connection problem between the transmission member 13 and the movable member 12, according to the structure of the connection assembly 14 of this embodiment, when the structure of the transmission member 13 is inconvenient to be firmly connected to the movable member 12, in the practical application, two transmission members 13 may be prepared at the same time, or one transmission member 13 may also be cut into two transmission members 13. Moreover, it is ensured that the movable member 12 is firmly connected to the transmission member 13, thereby improving the transmission reliability of the transmission mechanism 1.

In this embodiment, the transmission member 13 includes a transmission body 134 and second engagement blocks 1341 disposed on two sides of the transmission body 134, so that the transmission member 13 is slidably engaged in the section bar member 100. In other embodiments of the present application, the transmission member 13 may be engaged in the section bar member 100 through other structures.

In some exemplary embodiments, an end of the engagement end 1441 of each second connection member 144 is able to abut against the end face of a transmission member 13. Since the engagement end 1441 is able to abut against the end surface of the transmission member 13, the possibility of relative rotation between the engagement end 1441 and the transmission member 13 is effectively reduced, and the connection stability between the second connection member 144 and the transmission member 13 can be improved.

In some exemplary embodiments, the engagement end 1441 is connected to the first connection portion 123 through the second fixing member 145, so that the connection stability between the movable member 12 and the transmission member 13 can be improved, and the stability when the transmission mechanism 1 drives the transmission member 13 to move is improved.

In some embodiments, as shown in FIG. 3, FIG. 6, FIG. 10, and FIG. 12, the first connection portion 123 is formed with a first stopper groove 1231. The notch of the first stopper groove 1231 opens toward the transmission member 13. The first stopper groove 1231 is provided with multiple first limiting protrusions 1232 disposed at intervals. The connection assembly 14 is provided with multiple second limiting protrusions 146 disposed at intervals. When the first connection portion 123 sleeves the connection assembly 14, each second limiting protrusion 146 is fittingly disposed between corresponding two adjacent first limiting protrusions 1232, or each first limiting protrusion 1232 is fittingly disposed between corresponding two adjacent second limiting protrusions 146, or each second limiting protrusion 146 is fittingly disposed between corresponding two adjacent first limiting protrusions 1232, and each first limiting protrusion 1232 is fittingly disposed between corresponding two adjacent second limiting protrusions 146.

The connection member 14 is configured to pass through the first connection portion 123 and the transmission member 13, so that the connection member 14 is able to stop the relative displacement of the movable member 12 and the transmission member 13 in the vertical direction. At the same time, the fitting between a first limiting protrusion 1232 and a second limiting protrusion 146 is able to stop the first connection portion 123 and the connection member 14 in the length direction of the first mounting groove 120, so that the connection member 14 can reliably connect the connection member 12 and the transmission member 13. In this manner, the possibility of the relative displacement between the movable member 12, the connection member 14, and the transmission member 13 is effectively reduced, thereby improving the motion accuracy of the transmission mechanism 1.

Figure 4:
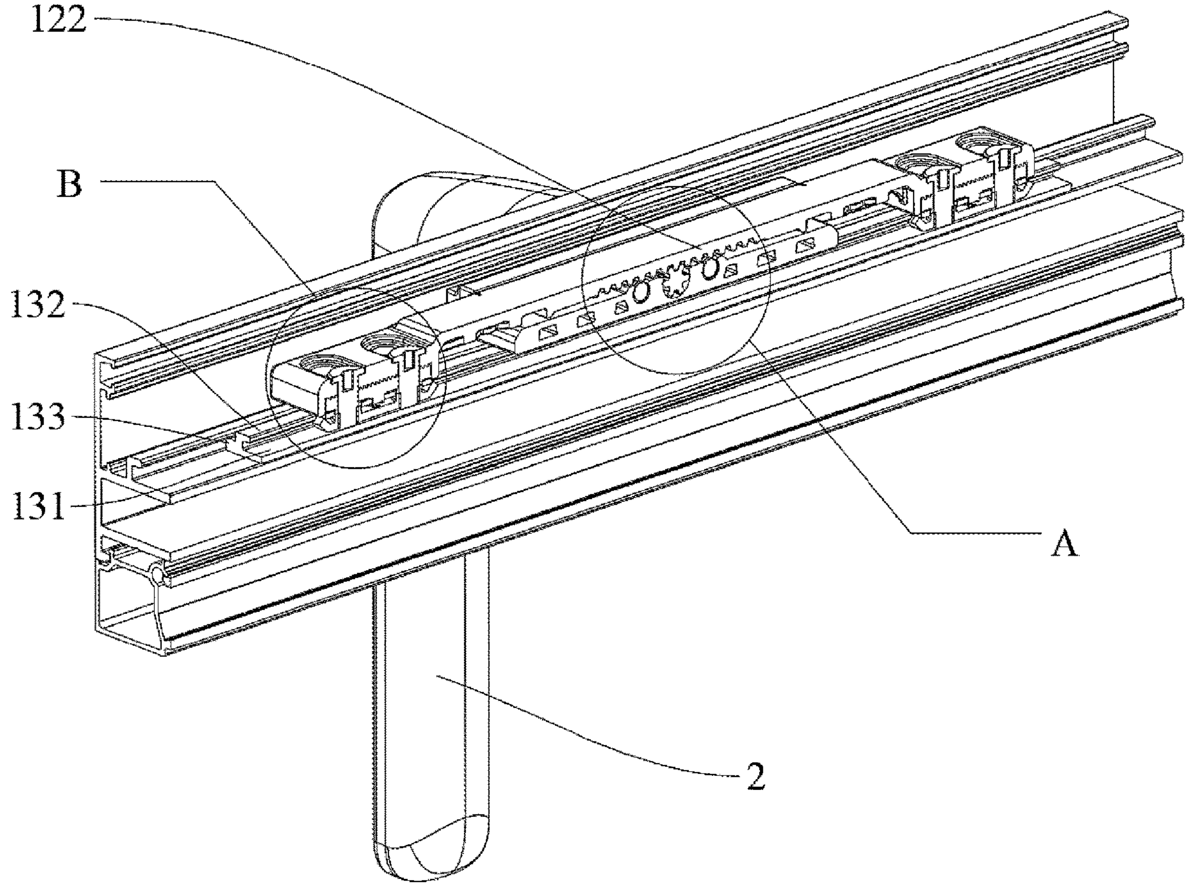
FIG. 4 is a view illustrating the internal structure of a driving device according to embodiment one of the present application.

In some embodiments, as shown in FIGS. 1, 4, and 6, the first connection portion 123 is formed with a connection hole 1233. The connection assembly 14 is configured to pass through the connection hole 1233. The connection assembly 14 has a limiting end. The limiting end can abut against the top wall of the first connection portion 123.

The connection hole 1233 and the limiting end are configured to facilitate the connection assembly 14 to firmly lock the first connection portion 123 on the transmission member 13, so that the movable member 12 is firmly connected to the transmission member 13.

In an exemplary embodiment, a chamfered surface or a rounded surface may be formed between the connection hole 1233 and the top wall of the first connection portion 123 to improve the aesthetic of the first connection portion 123 and facilitate the fitting between the first connection portion 123 and the connection assembly 14. The specific structure of the connection hole 1233 may be determined according to actual requirements. This does not need to be specifically limited in the embodiments.

In some exemplary embodiments, as shown in FIG. 6, the connection hole 1233 may be configured as a countersunk hole. The countersunk hole is configured to facilitate the fitting between the connection assembly 14 and the connection hole 1233, thereby improving the contact area between the connection assembly 14 and the connection hole 1233. At the same time, it is also convenient to dispose the end of the connection assembly 14 inside the top wall of the first connection portion 123 to prevent the end of the connection assembly 14 from protruding from the first connection portion 123, thereby improving the connection stability between the movable member 12 and the transmission member 13.

In an exemplary embodiment, the inner wall of the countersunk section of the countersunk hole may be configured as a plane or a planar recess. The specific structure of the countersunk hole can be determined according to actual requirements. This does not need to be specifically limited in the embodiments.

In some embodiments, as shown in FIGS. 1, 4, and 6, the connection hole 1233 is a waist-shaped hole. An included angle is formed between the length direction of the waist-shaped hole and the length direction of the movable member 12.

Since the connection hole 1233 is configured as a waist-shaped hole, the connection member 14 is able to be displaced in the length direction of the waist-shaped hole, that is, the connection member 14 and the first connection portion 123 is able to be displaced relative to each other. At the same time, after the connection member 14 is connected to the transmission member 13, the position of the connection assembly 14 relative to the section bar member 100 is fixed. That is, the positions of the mounting housing 11 and the movable member 12 relative to the section bar member 100 may be adjusted according to actual conditions. For example, when the sidewall of the mounting housing 11 and the sidewall of the movable member 12 do not abut against the mounting wall 110 of the section bar member 100, the connection member 14 also does not abut against the limit position of the waist-shaped hole. At this time, the mounting housing 11 is able to be driven to move relative to the section bar member 100 by moving the movable member 12. When the mounting housing 11 abuts against the mounting wall 110, the connection member 14 is firmly connected to the transmission member 13, so that the movable member 12 is firmly connected to the transmission member 13. Moreover, it is ensured that the mounting housing 11 abuts against the mounting wall 110. That is, since in this embodiment, the connection hole 1233 is a waist-shaped hole, the position of the mounting housing 11 on the section bar member 100 is able to be adjusted according to actual requirements. For example, when the transmission member 13 is mounted at a preset position on the section bar member 100, and if the central axis of the movable member 12 is the same as the central axis of the transmission member 13, there is a clearance between the mounting housing 11 and the mounting wall 110. At this time, since the connection position between the movable member 12 and the transmission member 13 is not fixed, the movable member 12 can move toward the direction adjacent to the mounting wall 110 under the action of the waist-shaped hole, and the mounting housing 11 abuts against the mounting wall 110. In this manner, the adaptability of the transmission mechanism 1 can be effectively improved, and the configuration can be applied to a variety of different section bar members 100.

In some exemplary embodiments, the length direction of the waist-shaped hole is perpendicular to the length direction of the movable member 12. When the mounting housing 11 moves a preset length in the direction perpendicular to the length of the movable member 12, the distance between the sidewall of the mounting housing 11 and the mounting wall 110 varies the most, so that the position of the mounting housing 11 on the section bar member 100 can be adjusted, and the mounting housing 11 is quickly connected to the mounting wall 110, thereby improving the mounting efficiency of the transmission mechanism 1.

In some exemplary embodiments, as shown in FIG. 15, the section area of the first external tooth portion 231 is similar to the section area of the second external tooth portion 232, so that the second external tooth portion 232 can have a smaller size, and the connection space between the lever handle 2 and the transmission mechanism 1 can be reduced. Thus, the lever handle 2 can drive the transmission mechanism 1 to move in a small space, thereby improving the applicability of the lever handle 2. The actual size of the second external tooth portion 232 may be determined according to actual requirements. The section area of the second external tooth portion 232 is not intended to limit the present application.

Figure 18:
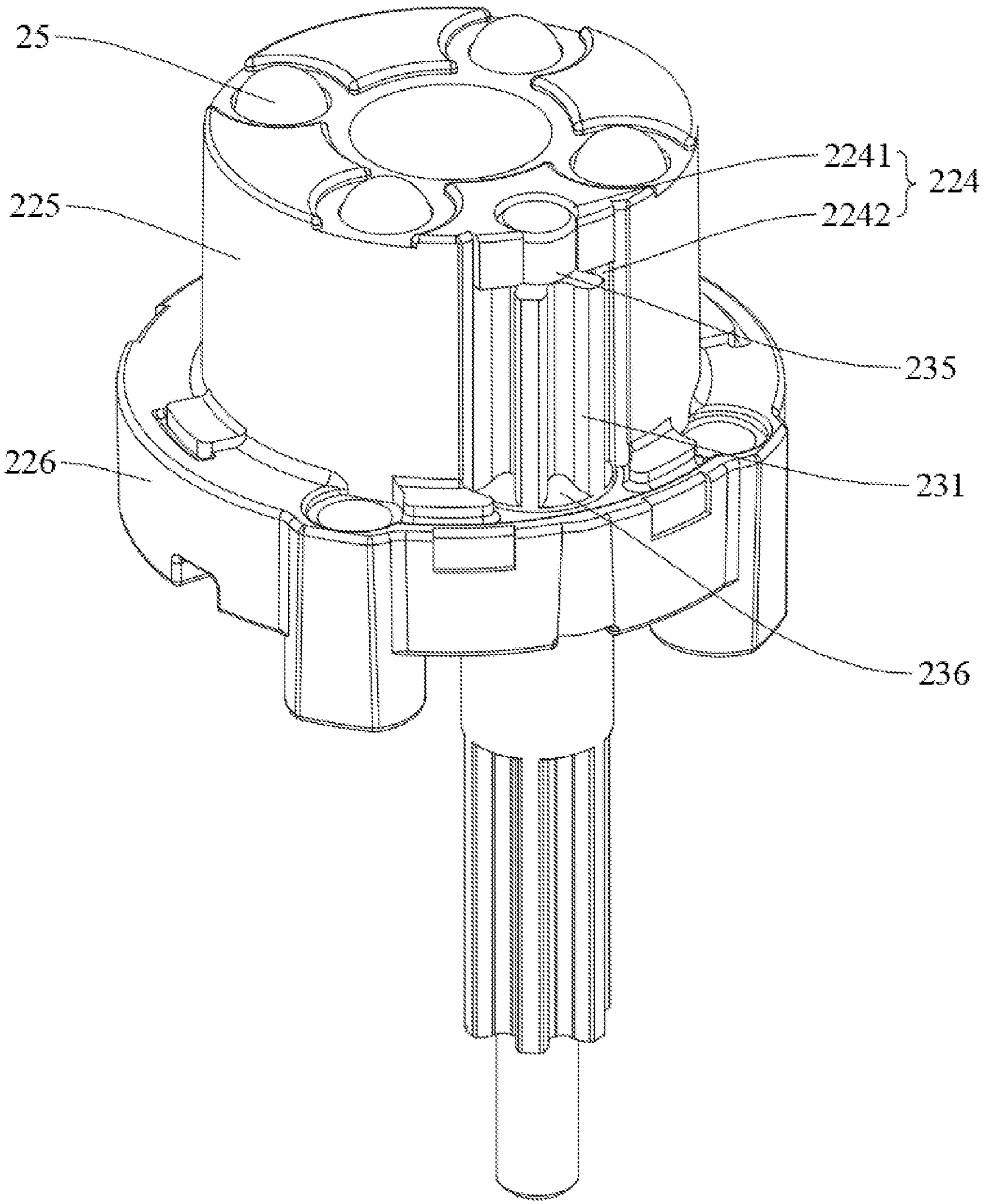
FIG. 18 is a view illustrating the structure of a mount and a connection shaft according to embodiment one of the present application.
Figure 20:
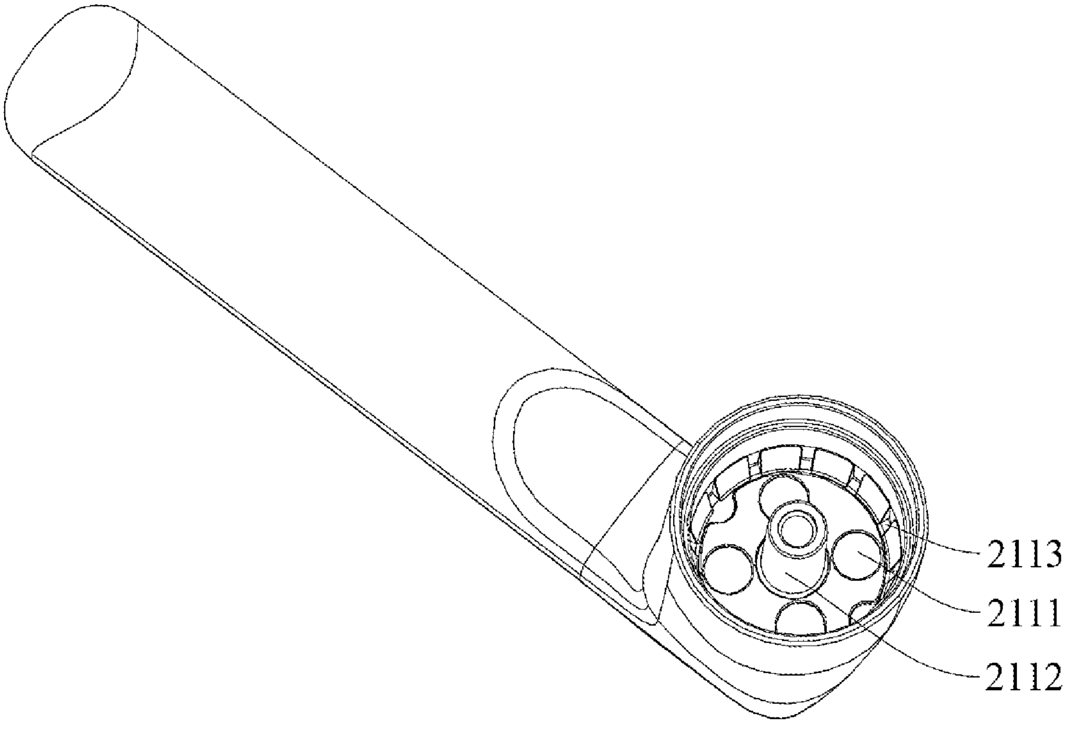
FIG. 20 is a view illustrating the structure of a handle according to embodiment one of the present application.

In some embodiments, as shown in FIGS. 15, 18, and 20, the bottom wall of the second mounting groove 211 is formed with multiple grooves 2111 evenly distributed around the central axis of the second mounting groove 211. The lever handle 2 also includes multiple second elastic members 25. Each second elastic member 25 corresponds to a groove 2111. First ends of the multiple second elastic members 25 abut against the mount 22. Second ends of the multiple second elastic members 25 abut against the bottom wall of the second mounting groove 211 or bottom walls of the grooves 2111.

The distance between the bottom walls of the grooves 2111 and the mount 22 is greater than the distance between the bottom wall of the second mounting groove 211 and the mount 22. When the handle 21 rotates on the mount 22, the bottom wall of the second mounting groove 211 and the bottom walls of the grooves 2111 abut against the second elastic member 25 respectively, and the elasticity applied by the second elastic member 25 to the bottom wall of the second mounting groove 211 is greater than the elasticity applied by the second elastic member 25 to the bottom walls of the grooves 2111. In this manner, when an operator rotates the handle 21, the mount 22 can apply different forces to the handle 21. The operator can roughly determine the rotation position of the handle 21 according to different forces and then determine the motion itinerary of the transmission mechanism 1, thereby improving the user experience of the operator.

In addition, the second elastic member 25 may also be configured to be in a relaxed state when the second elastic member 25 abuts against the bottom walls of the grooves 2111, and in a compressed state when the second elastic member 25 abuts against the bottom wall of the second mounting groove 211, thereby improving the handfeel difference of the operator when the handle 21 is located at different positions of the mount 22.

For example, four second elastic members 25 and four grooves 2111 may be disposed. The included angle between the two adjacent second elastic members 25 and the center of the second mounting groove 211 is 90 degrees. When the handle 21 is in an initial position, the bottom walls of the grooves 2111 is able to abut against the second elastic member 25. When the handle 21 is over-rotated, the bottom walls of the grooves 2111 abut against the second elastic member 25 again. When the handle 21 is over-rotated, the connection shaft 23 can drive the transmission mechanism 1 to move a preset distance. Thus, when the operator rotates the handle 21, it is possible to determine that the transmission mechanism 1 moves a preset distance according to the force felt for the second time that the bottom walls of the grooves 2111 abut against the second elastic member 25, thereby improving the user experience of the operator.

In some embodiments, as shown in FIGS. 15 and 20, the handle 21 also includes a mounting base 27. The mounting base 27 is disposed in the second mounting groove 211. The mounting base 27 is formed with a mounting through-hole 271. The internal tooth portion 272 is disposed on the inner wall of the mounting through-hole 271. The mount 22 is configured to pass through the mounting through-hole 271 and abuts against the bottom of the second mounting groove 211.

The mounting base 27 is configured to reduce the difficulty of forming the internal tooth portion 272 directly on the second mounting groove 211 of the handle 21, thereby reducing the processing difficulty of the lever handle 2 and improving the component production efficiency of the lever handle 2.

In other embodiments of the present application, the internal tooth portion 272 may be integrally formed in the second mounting groove 211. In other embodiments of the present application, the specific forming method of the internal tooth portion 272 in the second mounting groove 211 is not limited.

Figure 19:
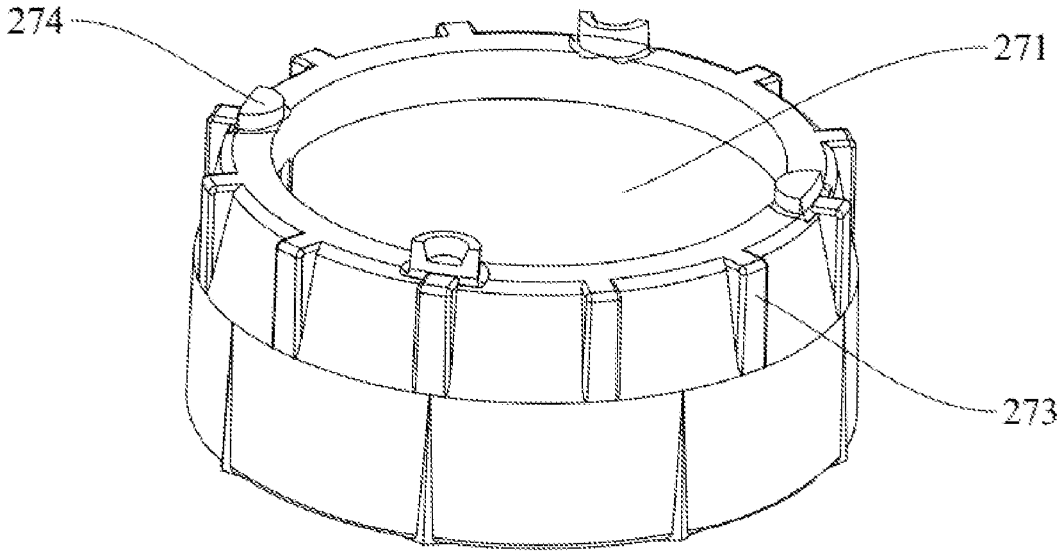
FIG. 19 is a view illustrating the structure of a mounting base according to embodiment one of the present application.
Figure 21:
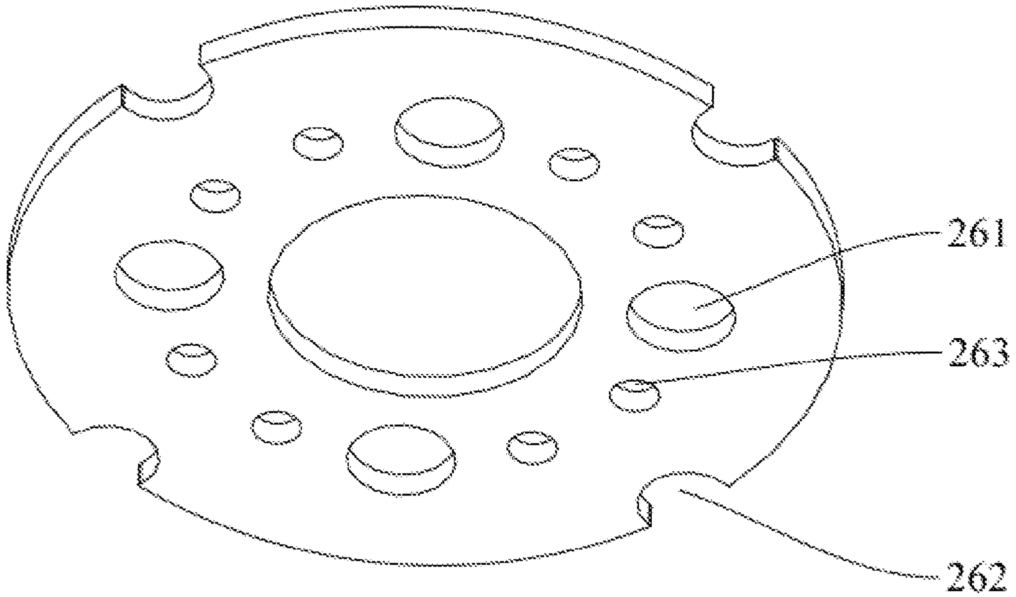
FIG. 21 is a view illustrating the structure of a positioning member according to embodiment one of the present application.

In an exemplary embodiment, as shown in FIGS. 19 and 21, the mounting base 27 is provided with a positioning column 274. A positioning member 26 is formed with a positioning port 262 which is engaged with the positioning column 274.

In an exemplary embodiment, as shown in FIG. 15, a gasket 29 is disposed between the mount 22 and the mounting base 27.

Figure 17:
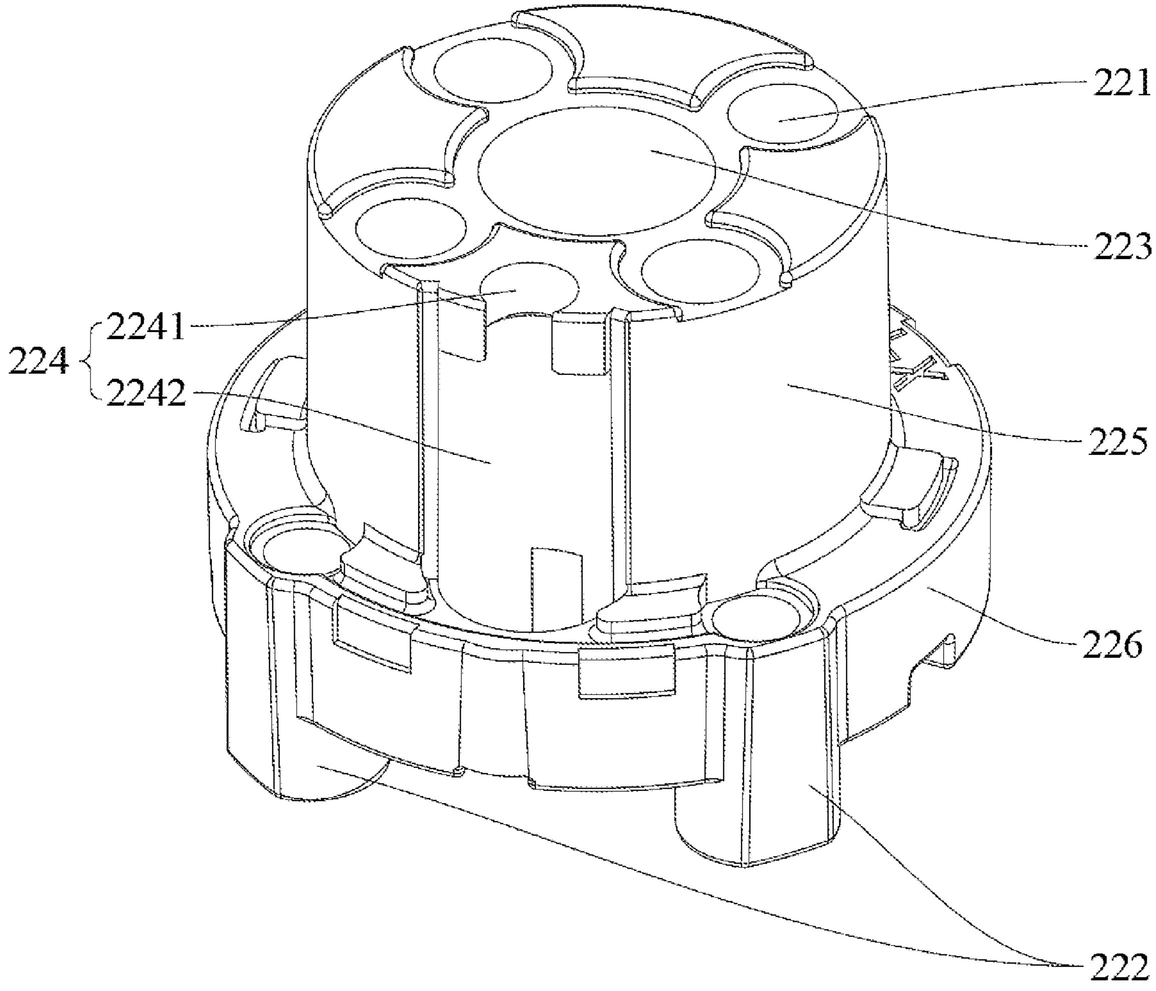
FIG. 17 is a view illustrating the structure of a mount according to embodiment one of the present application.

In some embodiments, as shown in FIGS. 15, 17, and 18, the mount 22 is formed with multiple blind holes 221 at an end of the mount 22 facing the handle 21. Each second elastic member 25 is disposed in a blind hole 221. The second elastic member 25 includes a second elastic portion 251 and a second rigid portion 252. A first end of the second elastic portion 251 abuts against the bottom wall of a blind hole 221. The second rigid portion 252 abuts against a second end of the second elastic portion 251. A part of the second rigid portion 252 protrudes from the mount 22.

The blind hole 221 is not only configured to facilitate the mounting of the second elastic member 25, but also to improve the utilization rate of the space occupied by the mount 22. During the movement, the handle 21 compresses the second rigid portion 252 and makes a part of the second rigid portion 252 abut against the inner wall of the blind hole 221. The second rigid portion 252 compresses the second elastic portion 251 under the drive of the handle 21 so that the second elastic portion 251 is compressed in the vertical direction. The second rigid portion 252 and the second elastic portion 251 are configured to prevent the second elastic member 25 from bending during the use. Only the second rigid portion 252 may abut against the inner wall of the blind hole 221 and is subjected to the pressure in the horizontal direction. Thus, irreversible damage to the second elastic member 25 caused by the rotation of the handle 21 is reduced, and the service life of the second elastic member 25 is prolonged. In addition, in this embodiment, during the use of the second elastic member 25, the second rigid portion 252 can abut against the bottom walls of the grooves 2111. Since the second rigid portion 252 has rigidity, it is possible to provide the operator with relatively obvious use feedback.

For example, the second rigid portion 252 may be configured as a steel ball. When the operator drives the handle 21 to rotate, the sidewall of a groove 2111 applies small pressure on the steel ball, so that the bottom wall of the second mounting groove 211 adjacent to the groove 2111 can more conveniently compress the steel ball, thereby reducing the resistance encountered by the operator when the operator rotates the handle 21. In addition, the steel ball can be configured to avoid the phenomenon that the second rigid portion 252 is jammed in a groove 2111, thereby reducing the failure phenomenon that the second elastic member 25 cannot rotate the handle 21.

For example, the second elastic portion 251 may be configured as a spring.

In some embodiments, as shown in FIG. 15, the handle 21 also includes a positioning member 26. The positioning member 26 is disposed on the bottom wall of the second mounting groove 211. The mount 22 abuts against the positioning member 26. The positioning member 26 is formed with multiple second communication holes 261. Each second communication hole 261 corresponds to a groove 2111.

The positioning member 26 can be configured to increase the spacing between the bottom wall of the second mounting groove 211 and the bottom wall of a groove 2111, thereby increasing the difference value between the elasticity applied by the second elastic member 25 to the bottom wall of the second mounting groove 211 and the elasticity applied by the second elastic member 25 to the bottom wall of a groove 2111. In this manner, the handfeel difference of the operator when the handle 21 is located at different positions of the mount 22 is improved, thereby further improving the user experience of the operator. In addition, the positioning member 26 is disposed on the bottom wall of the second mounting groove 211, so that the service life of the positioning member 26 can be prolonged, and when the positioning member 26 is worn, the lever handle 2 can be easily removed and replaced, thereby reducing the maintenance costs of the lever handle 2.

In an exemplary embodiment, the positioning member 26 may be configured as a stainless steel member having excellent wear resistance. The stainless steel member can be configured to reduce the wear between the positioning member 26 and the second elastic member 25. The positioning member 26 can be configured to prolong the service life of the lever handle 2 on the premise that the processing is facilitated.

In other embodiments of the present application, the positioning member 26 may be integrally formed on the bottom wall of the second mounting groove 211. In this case, the end of the handle 21 provided with the second mounting groove 211 may be processed and formed with a wear-resistant material, for example, stainless steel, to implement the purpose of prolonging the service life of the lever handle 2. In other embodiments of the present application, the mounting and forming method of the positioning member 26 is not specifically limited.

In some exemplary embodiments, as shown in FIGS. 15 and 21, the positioning member 26 is also formed with a feedback hole 263. The diameter of the feedback hole 263 is less than the diameter of the second communication hole 261. Multiple feedback holes 263 are disposed between two adjacent second communication holes 261. Multiple feedback holes 263 are all located on the movement track of the second elastic member 25.

Since the diameter of the feedback hole 263 is less than the diameter of the second communication hole 261, the second elastic member 25 cannot extend through the feedback hole 263 and is only able to abut against the circumferential surface of the feedback hole 263. When the feedback hole 263 rotates onto the second elastic member 25, the second elastic member 25 applies a different feedback force to the feedback hole 263 from the feedback force when the second elastic member 25 abuts against the bottom wall of the second mounting groove 211, thereby increasing the handfeel category of the second elastic member 25 for the operator when the handle 21 rotates and improving the handfeel experience of the operator.

In an exemplary embodiment, two feedback holes 263 are disposed between two adjacent second communication holes 261. The radian between the two feedback holes 263 is 30 degrees. The radian between the feedback hole 263 and the second communication hole 261 is 30 degrees. In this manner, mechanical vibration feedback can be better provided to the operator.

In some exemplary embodiments, as shown in FIGS. 19 and 20, multiple second stopper grooves 2113 are formed in the inner wall of the second mounting groove 211. Multiple stop blocks 273 are formed in the sidewall of the mounting base 27. Each stop block 273 is engaged in a second stopper groove 2113.

The second stopper grooves 2113 and the stop blocks 273 are configured to enable the handle 21 to firmly and reliably drive the mounting base 27 to rotate during the rotation process, thereby avoiding the possibility of the slip phenomenon between the second mounting groove 211 and the mounting base 27.

In some embodiments, as shown in FIGS. 15 and 20, a second connection portion 2112 is formed on the bottom wall of the second mounting groove 211. An end of the second fastener 24 is connected to the second connection portion 2112.

Since the second mounting groove 211 sleeves the mount 22, and at the same time, the second mounting groove 211 rotatably moves only on the mount 22, the second connection portion 2112 is configured to effectively lengthen the connection length between the second fastener 24 and the handle 21. Since the connection length between the second fastener 24 and the handle 21 increases the length of the second connection portion 2112, the fastening effect of the second fastener 24 can be effectively enhanced, and the connection stability between the mount 22 and the handle 21 can be improved. For example, when the second fastener 24 is configured as a threaded structure, and since the threaded connection length between the second fastener 24 and the handle 21 is lengthened, the connection stability between the second fastener 24 and the handle 21 is effectively enhanced. In an embodiment, the increased length of other connection structures such as a pin connection can also enhance the connection stability between the second fastener 24 and the handle 21. In addition, the second connection portion 2112 can reduce the connection space between the second fastener 24 and the bottom wall of the second mounting groove 211, so that the thickness of the bottom wall of the second mounting groove 211 formed by the handle 21 is reduced. In this manner, the structure connection inside the second mounting groove 211 is more compact, and the space utilization rate of the second mounting groove 211 is higher, thereby reducing the volume of the lever handle 2.

In some exemplary embodiments, the radian of the internal tooth portion 272 may be set to 180 degrees.

According to the meshing relationship between the second external tooth portion 232 and the transmission mechanism 1, the transmission mechanism 1 is able to move a preset distance when the internal tooth portion 272 rotates a preset angle. The radian of the internal tooth portion 272 is set to 180°, so that the transmission mechanism 1 is able to move an ideal preset distance when the operator easily rotates the angle of the handle. In other embodiments of the present application, the radian of the internal tooth portion 272 may be determined according to actual requirements. For example, the radian of the internal tooth portion 272 may be set to 270° or 360°. This does not need to be specifically limited in the embodiments.

In some embodiments, as shown in FIGS. 14, 15, and 17, an end of the mount 22 is provided with an engagement protrusion 222. The engagement protrusion 222 is configured to pass through the section bar member 100.

When the lever handle 2 and the transmission mechanism 1 are mounted on the section bar member 100, the engagement protrusion 222 can stop the movement of the lever handle 2 relative to the section bar member 100. The connection structures such as screws configured to pass through the transmission mechanism 1, the section bar member 100, and the lever handle 2 can connect the mount 22 to the section bar member 100 firmly and reliably, thereby improving the mounting stability of the lever handle 2.

In some embodiments, as shown in FIG. 15, the central axis of the connection shaft 23 and the central axis of the second mounting groove 211 are parallel to each other and disposed at intervals.

With the preceding structure, the central portion of the second mounting groove 211 can be fully utilized, thereby reducing the occupied space of the lever handle 2.

In some embodiments, as shown in FIGS. 17 and 18, the outer peripheral surface of the mount 22 is formed with a second fitting groove 224. The connection shaft 23 fits in the second fitting groove 224.

With the preceding structure, the connection shaft 23 configured to pass through the mount 22 is able to fit with the internal tooth portion 272 in the second mounting groove 211.

In some exemplary embodiments, as shown in FIGS. 17 and 18, the second fitting groove 224 has a third fitting section 2241 and a fourth fitting section 2242. The third fitting section 2241 and the fourth fitting section 2242 have different cross-sectional areas. The connection shaft 23 also includes a fitting end 235. The fitting end 235 is connected to the first external tooth portion 231. A part of the fitting end 235 rotatably fits in the third fitting section 2241. The first external tooth portion 231 rotatably fits in the fourth fitting section 2242.

In the actual mounting process, since the mount 22 is fixedly connected to the section bar member 100, when the operator rotates the handle 21, the internal tooth portion 272 located in the second mounting groove 211 can drive the first external tooth portion 231 to rotate and then drive the second external tooth portion 232 to rotate, so that the driving effect of the lever handle 2 is implemented. With the preceding structure, it is possible to ensure that the connection shaft 23 is firmly rotatably connected to the mount 22. Thus, the connection shaft 23 can be prevented from skewing in the mount 22, and the jamming phenomenon of the connection shaft 23 is avoided. It is ensured that the connection shaft 23 can play a stable driving role driven by the handle 21.

In other embodiments of the present application, the stop between the connection shaft 23 and the mount 22 may also be implemented by other structures. Thus, the cross-sectional area of the third fitting section 2241 and the cross-sectional area of the fourth fitting section 2242 may also be set to be the same. This is not specifically limited in other embodiments of the present application.

In some exemplary embodiments, as shown in FIGS. 17 and 18, the mount 22 includes a first mounting section 225 and a second mounting section 226. The cross-sectional area of the first mounting section 225 is less than the cross-sectional area of the second mounting section 226. The second fitting groove 224 is disposed on the outer circumferential surface of the first mounting section 225. The cross-sectional area of the fitting end 235 is less than the cross-sectional area of the first external tooth portion 231. The connection shaft 23 also includes a connection section 236. Two ends of the connection section 236 are connected to the first external tooth portion 231 and the second external tooth portion 232 respectively. The connection shaft 23 is configured to pass through the second mounting section 226.

Since the cross-sectional area of the first mounting section 225 is less than the cross-sectional area of the second mounting section 226, there can be a clearance between the first mounting section 225 and the inner wall of the second mounting groove 211, so that the first external tooth portion 231 disposed on the outer circumferential surface of the first mounting section 225 is able to mesh with the internal tooth portion 272. At the same time, the cross-sectional area of the fitting end 235 is less than the cross-sectional area of the first external tooth portion 231, so that the third fitting section 2241 disposed on the circumferential surface of the first mounting section 225 having a smaller cross-sectional area is able to have a better stop effect on the fitting end 235. The connection section 236 is configured to pass through the second mounting section 226. The second mounting section 226 is also able to stop the connection section 236 to prevent the connection shaft 23 which is rotatably disposed in the mounting base 27 from being skewed. In addition, since the cross-sectional area of the first external tooth portion 231 fitted in the fourth fitting section 2242 is greater than the cross-sectional area of the fitting end 235, so that the step formed between the third fitting section 2241 and the fourth fitting section 2242 can have a stop effect on the first external tooth portion 231.

In other embodiments of the present application, the cross-sectional area of the first mounting section 225 may also be greater than the cross-sectional area of the second mounting section 226. The cross-sectional area of the fitting end 235 may also be greater than the cross-sectional area of the first external tooth portion 231. The specific fitting structure between the mount 22 and the connection shaft 23 may be determined according to actual requirements. This is not specifically limited in other embodiments of the present application.

Figure 16:
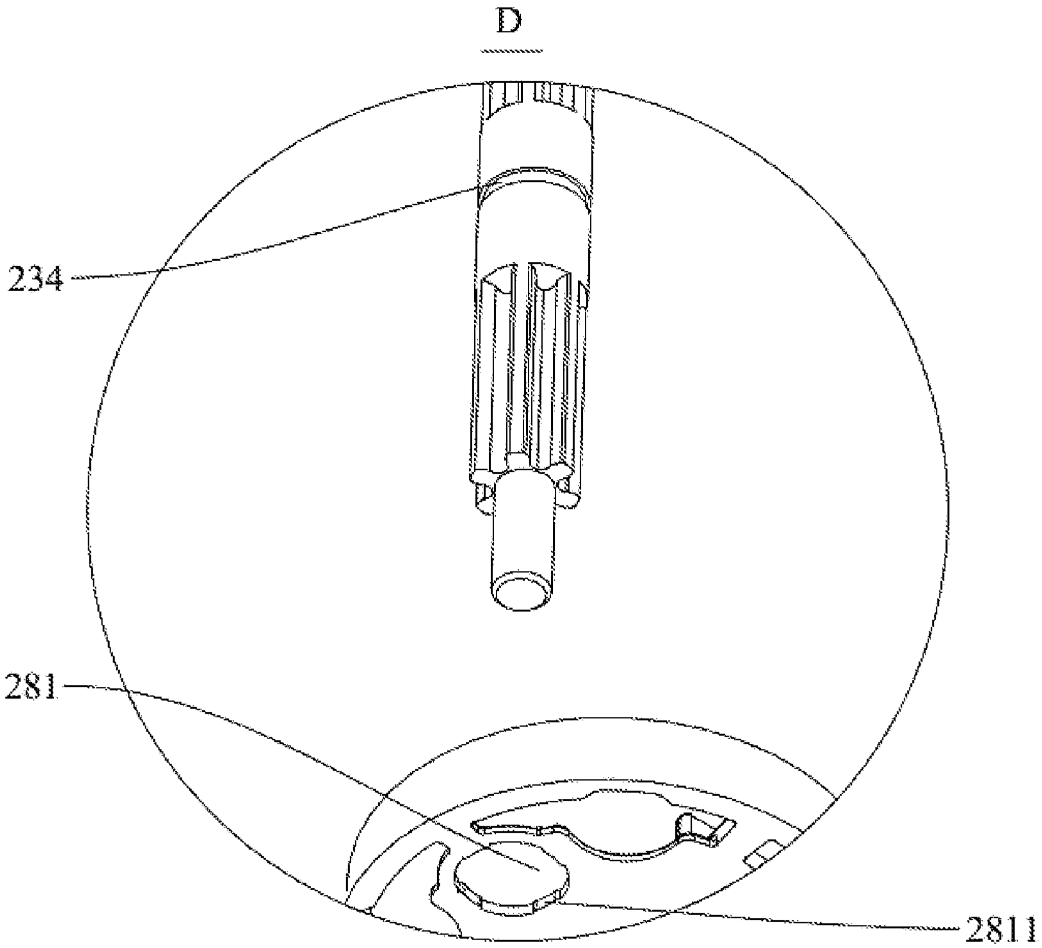
FIG. 16 is an enlarged partial view illustrating the structure of part D of FIG. 15.

In an exemplary embodiment, as shown in FIG. 16, the connection section 236 may be configured as a cylindrical section having a smooth outer peripheral surface to reduce the jamming phenomenon when the connection shaft 23 rotates in the second mounting section 226. For ease of processing, an integrally formed external tooth structure may also be directly processed on the connection shaft 23, and the connection shaft 23 having the fitting end 235 is configured to pass through the mount 22. A part of the external tooth structure is able to mesh with the internal tooth portion 272, and the other part is able to mesh with the transmission mechanism 1.

In some embodiments, as shown in FIGS. 14 and 15, the lever handle 2 also includes a closure member 28. The closure member 28 is disposed on an end of the mount 22. The end of the closure member 28 far from the mount 22 abuts against the section bar member 100.

The closure member 28 is configured to facilitate the closing processing of the second mounting groove 211. When the lever handle 2 abuts against the section bar member 100, there is a clearance of the closure member 28 between the handle 21 and the section bar member 100, so that the lever handle 2 can be mounted on the section bar member 100, and the mounting efficiency of the lever handle 2 is improved.

In some exemplary embodiments, as shown in FIGS. 15 and 16, the closure member 28 is formed with a connection shaft hole 281. The inner wall of the connection shaft hole 281 is provided with a stopper portion 2811. The connection shaft 23 is configured to pass through the connection shaft hole 281. The position of the connection shaft 23 corresponding to the connection shaft hole 281 is formed with an annular groove 234. The stopper portion 2811 extends into the annular groove 234.

The stopper portion 2811 extends into the annular groove 234 to stop the connection shaft 23. Thus, the connection shaft 23 is prevented from moving in the length direction of the connection shaft 23, and the connection shaft 23 can be prevented from falling off from the closure member 28, thereby improving the stability of the movement of the transmission mechanism 1 driven by the connecting shaft 23.

In an exemplary embodiment, there are multiple stopper portions 2811. Multiple stopper portions 2811 are uniformly distributed around the central axis of the connection shaft hole 281.

In some exemplary embodiments, a part of the mount 22 is configured to pass through the closure member 28, and a part of the closure member 28 is configured to pass through the mount 22. With the preceding structure, the closure member 28 can be stopped, thereby reducing the possibility of relative displacement between the closure member 28 and the mount 22.

In some embodiments, as shown in FIGS. 2 and 7, the mounting housing 11 includes a first housing 113 and a second housing 114. The first housing 113 is disposed on the section bar member 100. The sidewall of the first housing 113 abuts against the mounting wall 110. A connection protrusion 1131 is disposed on the side of the first housing 113 far away from the mounting wall 110. The second housing 114 is disposed on the first mounting groove 120. The second housing 114 sleeves the connection protrusion 1131. Two stopper edges 112 are disposed on the first housing 113 and the second housing 114 respectively.

The first housing 113 and the second housing 114 are configured not only to facilitate the mounting of the mounting housing 11 on the section bar member 100, but also to facilitate the processing of the mounting housing 11, thereby reducing the processing difficulty of the mounting housing 11. At the same time, the connection projection 1131 can be configured to stop the second housing 114 so that the second housing 114 can be firmly and reliably connected to the first housing 113.

In some exemplary embodiments, as shown in FIG. 7, the bottom wall of the first housing 113 is formed with a locking groove 1132. The second housing 114 is formed with a first locking hole 1141. The locking assembly is configured to pass through the first locking hole 1141, the locking groove 1132, and the section bar member 100 and connected to the lever handle 2. The locking assembly and the section bar member 100 can simultaneously stop the first housing 113 and the second housing 114 so that the first housing 113 and the second housing 114 are firmly disposed on the section bar member 100 in the vertical direction.

In some embodiments, as shown in FIGS. 15 and 20, the inner wall of the sliding groove 111 is provided with a first elastic member 15. The sidewall of the movable member 12 is formed with a bypass groove 124. The first elastic member 15 is in a compressed state when the first elastic member 15 abuts against the sidewall of the movable member 12. The first elastic member 15 is in a relaxed state when the first elastic member 15 abuts against the bypass groove 124.

When the first elastic member 15 abuts against the sidewall of the movable member 12, the first elastic member 15 is able to apply elasticity to the movable member 12. When the first elastic member 15 abuts against the bypass groove 124, the elasticity of the first elastic member 15 received by the movable member 12 disappears. Thus, the operator can have two different senses of force when driving the movable member 12 to move through the lever handle 2, so that the operator can acquire the position information of the movable member 12 relative to the section bar member 100 according to the sense of driving the movable member 12 to move. In this manner, it is convenient for the operator to use the transmission mechanism 1. For example, when the first elastic member 15 abuts against the bypass groove 124, the movable member 12 can be disposed in an initial position, so that the first elastic member 15 is used as a positioning structure, thereby improving the user experience of the operator.

In some exemplary embodiments, as shown in FIGS. 2 and 7, the first elastic member 15 includes two first elastic portions 151 and one first rigid portion 152. Two first elastic portions 151 are disposed at intervals in the length direction of the transmission member 13. First ends of the two first elastic portions 151 abut against the inner wall of the mounting housing 11, and second ends of the two first elastic portions 151 are connected to the first rigid portion 152. It is to be understood that the first rigid portion 152 is configured to enable the first elastic member 15 to abut against the bypass groove 124 or the movable member 12.

In some embodiments, as shown in FIG. 7, the bottom wall of the sliding groove 111 is formed with a first fitting groove 1111. The first fitting groove 1111 is configured to bear the connection shaft 23.

The first fitting groove 1111 is disposed so that the connection shaft 23 does not need to be suspended. In this manner, the phenomenon that the connection shaft 23 is bent can be avoided. Thus, the transmission mechanism 1 can better protect the lever handle 2, and the service life of the lever handle 2 can be prolonged. In addition, the connection shaft 23 is disposed in the first fitting groove 1111, so that the spacing between the connection shaft 23 and the movable member 12 can be reduced, thereby reducing the height and the space occupied and improving the applicability of the transmission mechanism 1.

In an exemplary embodiment, as shown in FIGS. 7 and 15, the connection shaft 23 also includes a rotation section 233. The rotation section 233 is connected to the second external tooth portion 232. The first fitting groove 1111 includes a first fitting section 11111 and a second fitting section 11112. The depth of the first fitting section 11111 is greater than the depth of the second fitting section 11112. The second external tooth portion 232 fits in the first fitting section 11111. The rotation section 233 rotatably fits in the second fitting section 11112. With the preceding structure, the first fitting groove 1111 can better protect the connection shaft 23.

Figure 5:
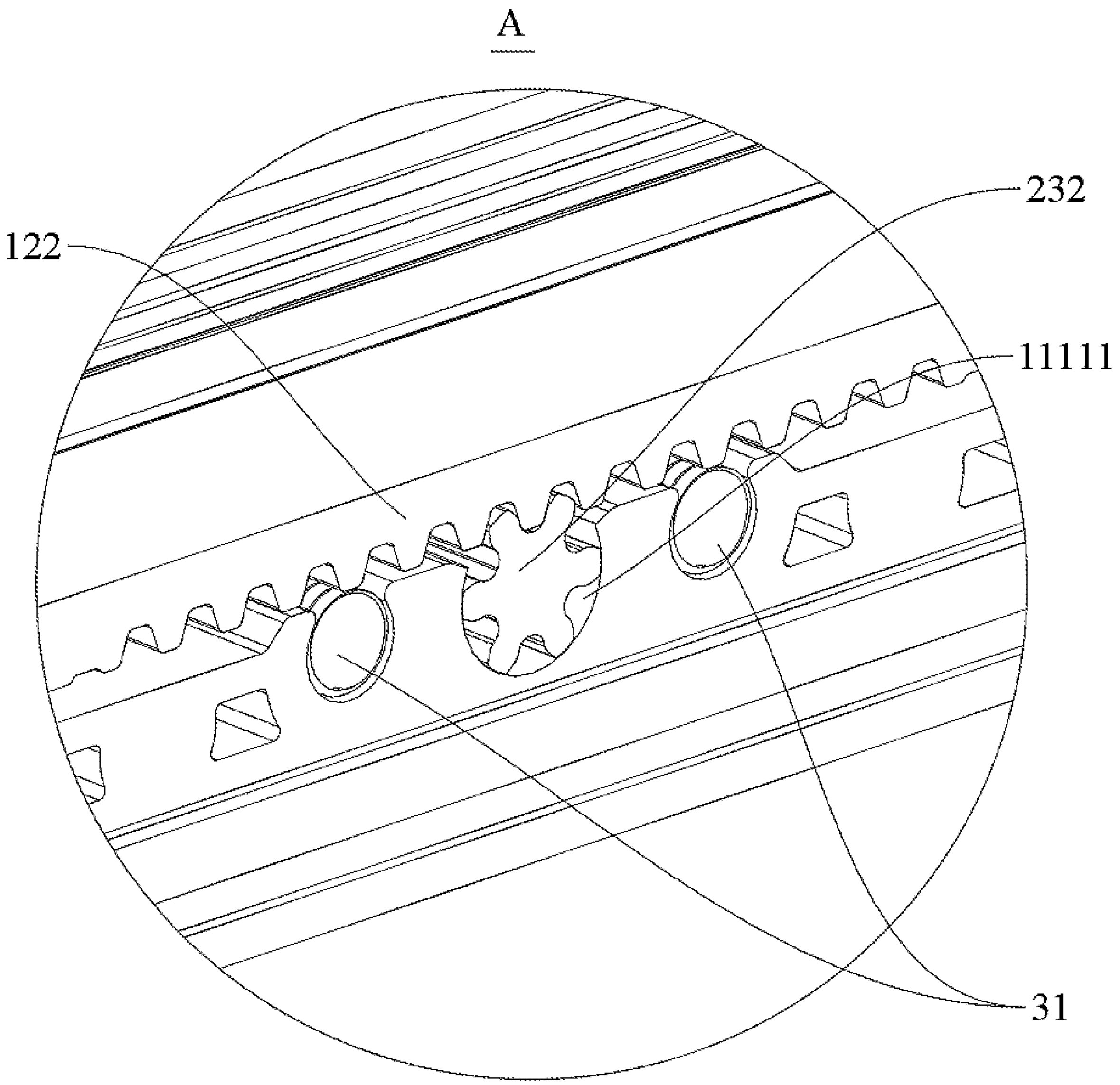
FIG. 5 is an enlarged partial view illustrating the structure of part A of FIG. 4.

In some exemplary embodiments, as shown in FIGS. 1 and 5, there are multiple engagement protrusions 222. At least one engagement protrusion 222 is disposed on each of two sides of the connection shaft 23.

During rotation of the handle 21, the handle 21 meshes with the connection shaft 23 configured to pass through the mount 22 and drives the connection shaft 23 to rotate at the same time. At least one engagement protrusion 222 is disposed on each of two sides of the connection shaft 23, so that the rotational power applied to the mount 22 by the handle 21 when the handle 21 rotates clockwise or counterclockwise can be reduced. Thus, the mount 22 preferably cancels the rotational power of the handle 21 when the handle 21 rotates under the action of the engagement protrusion 222, thereby improving the connection stability between the mount 22 and the section bar member 100.

In some exemplary embodiments, the central axis of the engagement protrusion 222 and the central axis of the second mounting groove 211 are parallel to each other and disposed at intervals.

In some embodiments, as shown in FIGS. 1 and 2, the locking mechanism 3 includes multiple locking members 31. At least one locking member 31 is disposed on each of two sides of the connection shaft 23.

At least one locking member 31 is disposed on each of two sides of the first fitting groove 1111, so that the torque applied to the mounting wall 110 by the lever handle 2 when the lever handle 2 rotates clockwise or counterclockwise can be reduced, thereby improving the connection stability between the transmission mechanism 1, the lever handle 2, and the section bar member 100.

Embodiment One

The driving device of an exemplary embodiment of the present application is described below with reference to FIGS. 1 to 7 and 14 to 21.

In this embodiment, the driving device includes a transmission mechanism 1, a lever handle 2, and a locking mechanism 3.

The transmission mechanism 1 includes a mounting housing 11, a movable member 12, and a connection assembly 14. The sidewall of the mounting housing 11 is able to abut against the mounting wall 110 of the section bar member 100. The mounting housing 11 can be disposed on the section bar member 100. The mounting housing 11 is formed with the sliding groove 111. stopper edges 112 are disposed on the tops of two sidewalls of the sliding groove 111. Each of the stopper edges 112 on two sidewalls of the sliding groove 111 extends in a direction proximate to the other sidewall. The movable member 12 is configured to pass through the sliding groove 11. Two sidewalls of the movable member 12 are provided with engagement strips 121 abutting against the stopper edges 112. The bottom wall of the movable member 12 is provided with the transmission rack 122.

There are two connection assemblies 14. Each of two ends of the movable member 12 is provided with a first connection portion 123. The first connection portion 123 sleeves the connection assembly 14. The connection assembly 14 is able to be connected to a first connection portion 123 and a transmission member 13.

The connection assembly 14 includes a first fastener 141, a compression assembly 142, and a first fixing member 143. The first fastener 141 is able to be slidably engaged in the connection groove 131 of the transmission member 13 in a length direction. The compression assembly 142 is able to be disposed on the top wall of the transmission member 13. The compression assembly 142 is able to fit with the first fastener 141 and clamp the transmission member 13. The first fixing member 143 is configured to pass through the first connection portion 123, the compression assembly 142, and the first fastener 141 and connected to the first fastener 141. The compression assembly 142 includes a compression member 1421 and a first connection member 1422. The compression assembly 1421 is able to be disposed on the transmission member 13. The recess portion 14211 is formed on the peripheral wall of the compression member 1421. The first connection member 1422 is disposed on the compression member 1421. The first connection member 1422 is provided with the fitting portion 14221 engaged in the recess portion 14211.

The first connection portion 123 is formed with the first stopper groove 1231. The notch of the first stopper groove 1231 opens toward the transmission member 13. The first stopper groove 1231 is provided with multiple first limiting protrusions 1232 disposed at intervals. The connection assembly 14 is provided with multiple second limiting protrusions 146 disposed at intervals. When the first connection portion 123 sleeves the connection assembly 14, each second limiting protrusion 146 is fittingly disposed between corresponding two adjacent first limiting protrusions 1232, or each first limiting protrusion 1232 is fittingly disposed between corresponding two adjacent second limiting protrusions 146, or each second limiting protrusion 146 is fittingly disposed between corresponding two adjacent first limiting protrusions 1232, and each first limiting protrusion 1232 is fittingly disposed between corresponding two adjacent second limiting protrusions 146. The first connection portion 123 is formed with the connection hole 1233. The connection assembly 14 is configured to pass through the connection hole 1233. The connection assembly 14 has a limiting end. The limiting end can abut against the top wall of the first connection portion 123. The connection hole 1233 is a waist-shaped hole. An included angle is formed between the length direction of the waist-shaped hole and the length direction of the movable member 12.

The mounting housing 11 includes a first housing 113 and a second housing 114. The first housing 113 is disposed on the section bar member 100. The sidewall of the first housing 113 abuts against the mounting wall 110. A connection protrusion 1131 is disposed on the side of the first housing 113 far away from the mounting wall 110. The second housing 114 is disposed on the first mounting groove 120. The second housing 114 sleeves the connection protrusion 1131. Two stopper edges 112 are disposed on the first housing 113 and the second housing 114 respectively. The inner wall of the sliding groove 111 is provided with a first elastic member 15. The sidewall of the movable member 12 is formed with the bypass groove 124. The first elastic member 15 is in a compressed state when the first elastic member 15 abuts against the sidewall of the movable member 12. The first elastic member 15 is in a relaxed state when the first elastic member 15 abuts against the bypass groove 124. The bottom wall of the sliding groove 111 is formed with the first fitting groove 1111. The first fitting groove 1111 can be configured to bear the connection shaft 23.

The lever handle 2 may be mounted on another side of the mounting wall 110. The lever handle 2 includes a handle 21, a mount 22, a connection shaft 23, and a second fastener 24. An end of the lever handle 2 is formed with a second mounting groove 211. The second mounting groove 211 is provided with the internal tooth portion 272. The mount 22 is disposed in the second mounting groove 211. The mount 22 is able to be connected to the section bar member 100. The connection shaft 23 is rotatably disposed in the mount 22. Two ends of the connection shaft 23 are provided with the first external tooth portion 231 and the second external tooth portion 232. The first external tooth portion 231 meshes with the internal tooth portion 272. The second external tooth portion 232 can mesh with the transmission rack 122. A fastener is configured to pass through the mount 22. An end of the fastener is connected to the bottom wall of the second mounting groove 211.

The bottom wall of the second mounting groove 211 is formed with multiple grooves 2111 evenly distributed around the central axis of the second mounting groove 211. The lever handle 2 also includes multiple second elastic members 25. Each second elastic member 25 corresponds to a groove 2111. First ends of the multiple second elastic members 25 abut against the mount 22. Second ends of the multiple second elastic members 25 abut against the bottom wall of the second mounting groove 211 or bottom walls of the grooves 2111.

The handle 21 further includes a mounting base 27. The mounting base 27 is disposed in the second mounting groove 211. The mounting base 27 is formed with the mounting through-hole 271. The internal tooth portion 272 is disposed on the inner wall of the mounting through-hole 271. The mount 22 is configured to pass through the mounting through-hole 271 and abuts against the bottom of the second mounting groove 211. The mount 22 is formed with multiple blind holes 221 at an end of the mount 22 facing the handle 21. Each second elastic member 25 is disposed in a blind hole 221. The second elastic member 25 includes a second elastic portion 251 and a second rigid portion 252. The first end of the second elastic portion 251 abuts against the bottom wall of a blind hole 221. The second rigid portion 252 abuts against the second end of the second elastic portion 251. A part of the second rigid portion 252 protrudes from the mount 22. The handle 21 further includes a positioning member 26. The positioning member 26 is disposed on the bottom wall of the second mounting groove 211. The mount 22 abuts against the positioning member 26. The positioning member 26 is provided with multiple second communication holes 261. Each second communication hole 261 corresponds to a groove 2111. The positioning member 26 is also formed with the feedback hole 263. The diameter of the feedback hole 263 is less than the diameter of the second communication hole 261. Multiple feedback holes 263 are disposed between two adjacent second communication holes 261. Multiple feedback holes 263 are all located on the movement track of the second elastic member 25.

There are multiple engagement protrusions 222. At least one engagement protrusion 222 is disposed on each of two sides of the connection shaft 23.

The locking mechanism 3 is able to be configured to pass through the mounting housing 11 and the mounting wall 110 and connected to the mount 22. The locking mechanism 3 includes multiple locking members 31. At least one locking member 31 is disposed on each of two sides of the connection shaft 23.

Embodiment Two

The driving device of this embodiment is substantially the same as the structure of embodiment one. The difference between the two is the structure of the connection assembly 14. Only the difference between the two is described herein. The same structure of this embodiment as the structure of embodiment one is not repeated herein.

As shown in FIGS. 8 to 12, the connection assembly 14 includes a second connection member 144 and a second fixing member 145. The bottom wall of the second connection member 144 is provided with the fastening protrusion 1443. The fastening protrusion 1443 is able to be configured to pass through the fitting hole 135 in the transmission member 13. The second fixing member 145 is configured to pass through the first connection portion 123 and connected to the second connection member 144. The second connection member 144 includes an engagement end 1441 and a connection end 1442. The engagement end 1441 is able to be slidably engaged in the section bar member 100. The connection end 1442 is connected to the engagement end 1441. The fastening protrusion 1443 is disposed on the connection end 1442.

According to the driving device according to this embodiment, since the transmission mechanism 1 has a small height, and the mounting housing 11 is disposed on the flanges 140 of the first mounting groove 120, the occupied space of the transmission structure 1 is reduced. Thus, there is no need to use the space of the first mounting groove 120 and the space of the section bar member 100 located below the first mounting groove 120, and the mounting housing 11 can be firmly disposed on the two flanges 140 of the first mounting groove 120. At the same time, the mounting structure in the second mounting groove 211 is simple and compact, so that the lever handle 2 can be firmly mounted on the section bar member 100. The second external tooth portion 232 is disposed on the connection shaft 23, so that the volume of the lever handle 2 and the volume of the transmission mechanism 1 can be reduced, and the lever handle 2 can drive the transmission mechanism 1 to move. Moreover, the lever handle 2 can be adapted to a mounting occasion of a small space, so that the driving device can be mounted without damaging the section bar member 100 and has a small mounting space requirement. Thus, during the mounting and use of the driving device of this embodiment, even when the height of the mounting wall 110 is limited, it is not necessary to perform additional processing on the section bar member 100 to form a large mounting space for the transmission mechanism 1, thereby ensuring the strength of the section bar member and reducing the mounting difficulty and the processing costs. The mounting housing 11, the movable member 12, and the locking mechanism 3 do not need to occupy the space of the first mounting groove 120, so that the transmission member 13 may be directly fitted in the first mounting groove 120. The transmission member 13 does not need to be cut off to be connected to two ends of the movable member 12 respectively, so that the mounting efficiency of the driving device on the section bar member 100 can be improved. In the actual application of the transmission mechanism 1 of this embodiment, according to actual requirements, one transmission member 13 may be used, or multiple transmission members 13 may also be used. In addition, since in the driving device according to this embodiment, the transmission rack 122 disposed on the movable member 12 fits with the connection shaft 23 of the lever handle 2, it is not necessary to additionally dispose other gear and rack structures inside the transmission mechanism 1. On the premise that the driving effect of the lever handle 2 on the transmission mechanism 1 is ensured, the number of internal fittings of the driving device is effectively reduced, and the assembly clearance between the internal fittings of the driving device is conveniently reduced.

In the description of the specification, the description of reference terms such as "some embodiments" and "other embodiments" is intended to mean that specific features, structures, materials, or characteristics described in conjunction with such embodiments or examples are included in at least one embodiment or example of the present application. In the specification, the illustrative description of the preceding terms does not necessarily refer to the same embodiment or example. Moreover, the described specific features, structures, materials or characteristics may be combined in an appropriate manner in any one or more embodiments or examples.

What is claimed is:

1. A driving device, comprising:

a transmission mechanism comprising a mounting housing and a movable member, wherein a sidewall of the mounting housing is capable of abutting against a mounting wall of a section bar member, the mounting housing is capable of being disposed on the section bar member, the mounting housing is formed with a sliding groove, and stopper edges are respectively disposed on tops of two sidewalls of the sliding groove; and the movable member is configured to pass through the sliding groove, two sidewalls of the movable member are respectively provided with engagement strips abutting against the stopper edges, and a bottom wall of the movable member is provided with a transmission rack;

a lever handle capable of being mounted on a side of the mounting wall and comprising a handle, a mount, a connection shaft, and a second fastener, wherein an end of the handle is formed with a second mounting groove, and the second mounting groove is provided with an internal tooth portion; the mount is disposed in the second mounting groove, and the mount is capable of being connected to the section bar member; the connection shaft is rotatably disposed in the mount, two ends of the connection shaft are provided with a first external tooth portion and a second external tooth portion, the first external tooth portion meshes with the internal tooth portion, and the second external tooth portion is capable of meshing with the transmission rack; and the second fastener is configured to pass through the mount, and an end of the second fastener is connected to a bottom wall of the second mounting groove; and a locking mechanism capable of being configured to pass through the mounting housing and the mounting wall and connected to the mount;

wherein the transmission mechanism further comprises a connection assembly, the movable member is provided with a first connection portion, each first connection portion sleeves the connection assembly, and the connection assembly is capable of being connected to a first connection portion and a transmission member; and wherein the first connection portion is formed with a first stopper groove, a notch of the first stopper groove opens toward the transmission member, the first stopper groove is provided with a plurality of first limiting protrusions disposed at intervals, the connection assembly is provided with a plurality of second limiting protrusions disposed at intervals, and when the first connection portion sleeves the connection assembly, each of the plurality of second limiting protrusions is fittingly disposed between corresponding two adjacent first limiting protrusions of the plurality of first limiting protrusions, or each of the plurality of first limiting protrusions is fittingly disposed between corresponding two adjacent second limiting protrusions of the plurality of second limiting protrusions, or the each second limiting protrusion is fittingly disposed between the corresponding two adjacent first limiting protrusions, and the each first limiting protrusion is fittingly disposed between the corresponding two adjacent second limiting protrusions.

2. The driving device according to claim 1, wherein the connection assembly comprises:

a first fastener capable of being slidably engaged in a connection groove of the transmission member in a length direction;

a compression assembly capable of being disposed on a top wall of the transmission member, and the compression assembly capable of fitting with the first fastener and clamping the transmission member; and a first fixing member configured to pass through the first connection portion, the compression assembly, and the first fastener and connected to the first fastener.

3. The driving device according to claim 2, wherein the locking mechanism comprises a plurality of second locking members, and at least one of the plurality of second locking members is disposed on each of two sides of the connection shaft.

4. The driving device according to claim 1, wherein the connection assembly comprises:

a second connection member provided with a fastening protrusion, wherein the fastening protrusion is capable of being configured to pass through a fitting hole in the transmission member; and a second fixing member configured to pass through the first connection portion and connected to the second connection member.

5. The driving device according to claim 4, wherein the locking mechanism comprises a plurality of second locking members, and at least one of the plurality of second locking members is disposed on each of two sides of the connection shaft.

6. The driving device according to claim 1, wherein the first connection portion is formed with a connection hole, the connection assembly is configured to pass through the connection hole, the connection assembly has a limiting end, and the limiting end is capable of abutting against a top wall of the first connection portion.

7. The driving device according to claim 6, wherein the connection hole is a waist-shaped hole, and an included angle is formed between a length direction of the waist-shaped hole and a length direction of the movable member.

8. The driving device according to claim 7, wherein the locking mechanism comprises a plurality of second locking members, and at least one of the plurality of second locking members is disposed on each of two sides of the connection shaft.

9. The driving device according to claim 6, wherein the locking mechanism comprises a plurality of second locking members, and at least one of the plurality of second locking members is disposed on each of two sides of the connection shaft.

10. The driving device according to claim 1, wherein the bottom wall of the second mounting groove is formed with a plurality of grooves evenly distributed around a central axis of the second mounting groove, the lever handle further comprises a plurality of second elastic members, each of the plurality of second elastic members corresponds to one of the plurality of grooves, first ends of the plurality of second elastic members abut against the mount, and second ends of the plurality of second elastic members abut against the bottom wall of the second mounting groove or bottom walls of the plurality of grooves.

11. The driving device according to claim 10, wherein the locking mechanism comprises a plurality of second locking members, and at least one of the plurality of second locking members is disposed on each of two sides of the connection shaft.

12. The driving device according to claim 1, wherein the handle further comprises a mounting base, the mounting base is disposed in the second mounting groove, the mounting base is formed with a mounting through-hole, the internal tooth portion is disposed on an inner wall of the mounting through-hole, and the mount is configured to pass through the mounting through-hole and abuts against a bottom of the second mounting groove.

13. The driving device according to claim 12, wherein the locking mechanism comprises a plurality of second locking members, and at least one of the plurality of second locking members is disposed on each of two sides of the connection shaft.

14. The driving device according to claim 1, wherein the locking mechanism comprises a plurality of second locking members, and at least one of the plurality of second locking members is disposed on each of two sides of the connection shaft.

15. The driving device according to claim 1, wherein the locking mechanism comprises a plurality of second locking members, and at least one of the plurality of second locking members is disposed on each of two sides of the connection shaft.

16. The driving device according to claim 1 wherein the locking mechanism comprises a plurality of second locking members, and at least one of the plurality of second locking members is disposed on each of two sides of the connection shaft.

* * * * *